US011555975B2

(12) United States Patent
Geens et al.

(10) Patent No.: US 11,555,975 B2
(45) Date of Patent: Jan. 17, 2023

(54) INDICIA AND METHOD FOR IDENTIFYING TELECOMMUNICATIONS COMPONENTS

(71) Applicant: COMMSCOPE TECHNOLOGIES LLC, Hickory, NC (US)

(72) Inventors: Johan Geens, Bunsbeek (BE); Roel Modest Willy Bryon, Kessel-Lo (BE); Pieter Doultremont, Kermt-Hasselt (BE); Philippe Coenegracht, Hasselt (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/043,337

(22) PCT Filed: Mar. 29, 2019

(86) PCT No.: PCT/US2019/025022
§ 371 (c)(1),
(2) Date: Sep. 29, 2020

(87) PCT Pub. No.: WO2019/191699
PCT Pub. Date: Oct. 3, 2019

(65) Prior Publication Data
US 2021/0026088 A1  Jan. 28, 2021

Related U.S. Application Data

(60) Provisional application No. 62/748,022, filed on Oct. 19, 2018, provisional application No. 62/727,807, (Continued)

(30) Foreign Application Priority Data

Nov. 27, 2018  (WO) ................ PCT/US2018/062535

(51) Int. Cl.
*G02B 6/44* (2006.01)
*H01R 13/46* (2006.01)

(52) U.S. Cl.
CPC ......... *G02B 6/4444* (2013.01); *G02B 6/4469* (2013.01); *H01R 13/465* (2013.01)

(58) Field of Classification Search
CPC ........................... G02B 6/4444; G02B 6/4469
See application file for complete search history.

(56) References Cited

U.S. PATENT DOCUMENTS

D190,157 S    4/1961  Bowen
D230,864 S    3/1974  Lyall
(Continued)

FOREIGN PATENT DOCUMENTS

CN    101054126 A    10/2007
CN    201311499 Y    9/2009
(Continued)

OTHER PUBLICATIONS

Extended European Search Report for Application No. 19775250.4 dated Jan. 7, 2022.
(Continued)

*Primary Examiner* — Sung H Pak
*Assistant Examiner* — Hoang Q Tran
(74) *Attorney, Agent, or Firm* — Merchant & Gould P.C.

(57) ABSTRACT

A telecommunications component includes an outer housing that includes a badge holder. The badge holder is configured to receive a badge. The badge is configured to be inserted into the badge holder. The badge includes a feature that is identifying of the source of the telecommunications component and the feature is at least one of a logo, a specific color, text information, a barcode, a QR code, and a RFID tag. The badge includes a pair of arms extending from opposing sides to engage with the badge holder of outer (Continued)

housing. The badge includes a securing feature that is configured to secure the badge within the badge holder.

19 Claims, 44 Drawing Sheets

Related U.S. Application Data filed on Sep. 6, 2018, provisional application No. 62/649,765, filed on Mar. 29, 2018.

(56) References Cited

U.S. PATENT DOCUMENTS

| | | |
|---|---|---|
| D251,730 S | 5/1979 | Root et al. |
| D253,731 S | 12/1979 | Mayfield |
| D256,016 S | 7/1980 | Iwata |
| D264,968 S | 6/1982 | Iwata |
| D304,170 S | 10/1989 | Kondo et al. |
| D304,339 S | 10/1989 | Collins et al. |
| D314,385 S | 2/1991 | Karan et al. |
| D314,557 S | 2/1991 | Fesmire et al. |
| 5,059,748 A | 10/1991 | Allen et al. |
| D328,058 S | 7/1992 | Suzuki et al. |
| D330,012 S | 10/1992 | Takahashi et al. |
| D333,461 S | 2/1993 | Shimizu et al. |
| D351,138 S | 10/1994 | Shimizu et al. |
| D355,887 S | 2/1995 | Rodeffer et al. |
| D357,285 S | 4/1995 | Feng |
| D358,753 S | 5/1995 | Yoshida et al. |
| D365,327 S | 12/1995 | Reed et al. |
| 5,787,219 A | 7/1998 | Mueller et al. |
| D402,663 S | 12/1998 | Fechner |
| D414,774 S | 10/1999 | Gauffin |
| D416,873 S | 11/1999 | Korsunsky et al. |
| D432,120 S | 10/2000 | Jennison et al. |
| D454,625 S | 3/2002 | Flanagan |
| D454,873 S | 3/2002 | Clark et al. |
| D455,714 S | 4/2002 | Kim |
| D491,932 S | 6/2004 | Nakamura |
| D526,615 S | 8/2006 | Nakashima et al. |
| 7,130,519 B2 | 10/2006 | Grubish et al. |
| 7,333,708 B2 | 2/2008 | Blackwell, Jr. et al. |
| D564,926 S | 3/2008 | Cherneff et al. |
| D569,752 S | 5/2008 | Cherneff et al. |
| D580,407 S | 11/2008 | Tanaka |
| D586,744 S | 2/2009 | Jaskari |
| 7,512,304 B2 | 3/2009 | Gronvall et al. |
| D591,288 S | 4/2009 | Miyazoe |
| D594,456 S | 6/2009 | Huang et al. |
| D595,239 S | 6/2009 | Inoue et al. |
| D600,213 S | 9/2009 | Inoue et al. |
| D602,445 S | 10/2009 | Liu |
| 7,605,707 B2 | 10/2009 | German et al. |
| 7,680,388 B2 | 3/2010 | Reagan et al. |
| D616,787 S | 6/2010 | Czach et al. |
| 7,740,409 B2 | 6/2010 | Bolton et al. |
| D619,992 S | 7/2010 | Wayman |
| D620,454 S | 7/2010 | Lissola et al. |
| 7,753,596 B2 | 7/2010 | Cox |
| D623,592 S | 9/2010 | Huang et al. |
| 7,844,158 B2 | 11/2010 | Gronvall et al. |
| D633,441 S | 3/2011 | Ishimaru et al. |
| 8,111,966 B2 | 2/2012 | Holmberg et al. |
| D662,091 S | 6/2012 | Loponen |
| D671,099 S | 11/2012 | Loponen |
| D673,533 S | 1/2013 | Ennabli |
| D675,949 S | 2/2013 | Chang et al. |
| D699,141 S | 2/2014 | Walker |
| 8,768,133 B2 | 7/2014 | Bryon et al. |
| 8,989,550 B2 | 3/2015 | Allen et al. |
| 9,150,338 B2 | 10/2015 | Verheyden et al. |
| 9,354,417 B2 | 5/2016 | Kingsbury |
| 9,366,837 B2 | 6/2016 | Claessens et al. |
| 9,400,363 B2 | 7/2016 | Coenegracht et al. |
| 9,502,878 B2 | 11/2016 | Coenegracht et al. |
| D780,698 S | 3/2017 | Karlen et al. |
| 9,647,437 B2 | 5/2017 | Aznag et al. |
| D797,193 S | 9/2017 | Csenar |
| 9,791,653 B2 | 10/2017 | Aznag et al. |
| D806,028 S | 12/2017 | Amasaki |
| 9,948,082 B2 | 4/2018 | Coenegracht et al. |
| 9,977,211 B1 | 5/2018 | Courchaine et al. |
| D844,322 S | 4/2019 | Bo |
| D846,538 S | 4/2019 | Wild |
| D853,996 S | 7/2019 | Wild |
| D854,522 S | 7/2019 | Wild |
| D858,495 S | 9/2019 | Wild |
| D858,496 S | 9/2019 | Wild |
| D861,684 S | 10/2019 | Chen et al. |
| D865,731 S | 11/2019 | Sun et al. |
| D868,035 S | 11/2019 | Andersson et al. |
| D888,060 S | 6/2020 | Cote et al. |
| D890,148 S | 7/2020 | Zhao |
| D891,408 S | 7/2020 | Kwak |
| D891,409 S | 7/2020 | Jeon |
| 10,732,369 B2 | 8/2020 | Holmberg et al. |
| D906,435 S | 12/2020 | Gronau et al. |
| D913,246 S | 3/2021 | Rosson et al. |
| 10,955,631 B2 | 3/2021 | Claessens et al. |
| D916,040 S | 4/2021 | Alfredsson et al. |
| D916,044 S | 4/2021 | Bryon et al. |
| D920,939 S | 6/2021 | Alfredsson et al. |
| D935,428 S | 11/2021 | Bryon et al. |
| 2002/0129527 A1 | 9/2002 | Vaudreuil |
| 2004/0035029 A1 | 2/2004 | Forsberg |
| 2005/0163448 A1 | 7/2005 | Blackwell, Jr. et al. |
| 2006/0057325 A1 | 3/2006 | Hodsdon et al. |
| 2006/0093303 A1 | 5/2006 | Reagan et al. |
| 2006/0147172 A1 | 7/2006 | Luther et al. |
| 2006/0148279 A1 | 7/2006 | German et al. |
| 2006/0150458 A1 | 7/2006 | Feroli et al. |
| 2008/0232743 A1 | 9/2008 | Gronvall et al. |
| 2008/0285933 A1 | 11/2008 | Vogel et al. |
| 2009/0074369 A1 | 3/2009 | Bolton et al. |
| 2009/0123115 A1 | 5/2009 | Gronvall et al. |
| 2009/0148118 A1 | 6/2009 | Gronvall et al. |
| 2011/0097050 A1 | 4/2011 | Blackwell, Jr. et al. |
| 2013/0004122 A1 | 1/2013 | Kingsbury |
| 2014/0061194 A1 | 3/2014 | Verheyden et al. |
| 2014/0226945 A1 | 8/2014 | Claessens et al. |
| 2015/0060539 A1 | 3/2015 | Thompson |
| 2015/0093090 A1 | 4/2015 | Aznag et al. |
| 2015/0137461 A1 | 5/2015 | Coenegracht et al. |
| 2015/0168663 A1 | 6/2015 | Aznag et al. |
| 2016/0240974 A1 | 8/2016 | Takano |
| 2016/0276779 A1* | 9/2016 | Lipke .................. G02B 6/3895 |
| 2017/0160491 A1 | 6/2017 | Zbinden |
| 2017/0160497 A1 | 6/2017 | Smith et al. |
| 2018/0156997 A1 | 6/2018 | Holmberg et al. |
| 2018/0157002 A1 | 6/2018 | Bishop et al. |
| 2019/0079251 A1 | 3/2019 | Everaert |
| 2020/0365062 A1 | 11/2020 | Geens et al. |
| 2021/0080665 A1 | 3/2021 | Claessens et al. |
| 2021/0119424 A1 | 4/2021 | Coenegracht et al. |
| 2021/0311276 A1 | 10/2021 | Ghammam et al. |

FOREIGN PATENT DOCUMENTS

| | | |
|---|---|---|
| CN | 103679256 A | 3/2014 |
| CN | 203799076 U | 8/2014 |
| CN | 106023794 A | 10/2016 |
| FR | 2 746 534 A1 | 9/1997 |
| JP | 2003-151377 A | 5/2003 |
| JP | 2015-531496 A | 11/2015 |
| KR | 20-2009-003103 U | 4/2009 |
| WO | 2012007904 A1 | 1/2012 |
| WO | 2012007905 A1 | 1/2012 |
| WO | 2014/060416 A1 | 4/2014 |
| WO | 2015/158687 A1 | 10/2015 |
| WO | 2016/184457 A1 | 11/2016 |
| WO | 2017/046359 A1 | 3/2017 |
| WO | 2017/091500 A1 | 6/2017 |
| WO | 2019/108507 A1 | 6/2019 |
| WO | 2019/191699 A1 | 10/2019 |

(56) References Cited

FOREIGN PATENT DOCUMENTS

| WO | 2019/209613 A1 | 10/2019 |
| --- | --- | --- |
| WO | 2019/209645 A1 | 10/2019 |
| WO | 2019/241347 A1 | 12/2019 |
| WO | 2020/014210 A1 | 1/2020 |
| WO | 2020/127276 A1 | 6/2020 |

OTHER PUBLICATIONS

Corning OptiSheath MultiPort Terminal. (Online PDF), [Retrieved Apr. 12, 2021] http://csmedia.corning.com/opcomm/Resource_Documents/product_family_specifications_rl/optisheath_multiport_terminal_NAFTA_AEN.pdf, 5 pages (Revised Aug. 11, 2015).

Extended European Search Report for Application No. 18884258.7 dated Jul. 12, 2021.

Titan-RTD-FTTx-System-spec-sheet. (Online PDF), [Retrieved Apr. 12, 2021] https://www.aflglobal.com/productlisl/Product-Lines/Optical-Connectivity-Apparatus/TITAN-RTD-Multiport-Terminal/doc/Titan-RTD-FTTx-System-spec-sheet.aspx, 2 pages (Revised 2016).

International Search Report and Written Opinion of the International Searching Authority for International Patent Application No. PCT/US2019/025022 dated Aug. 9, 2019, 13 pages.

International Search Report and Written Opinion of the International Searching Authority for International Patent Application No. PCT/US2018/062535 dated Apr. 1, 2019, 12 pages.

TE Connectivity, "Telecom Networks" catalog, Dec. 27, 2012 (146 pgs).

TE Connectivity, "Exhibit A—FOSC-600D" (admitted prior art as of Nov. 28, 2017).

TE Connectivity, "Exhibit B—FOSC-450C" (admitted prior art as of Nov. 28, 2017).

TE Connectivity, "Exhibit C—FOSC-450D" (admitted prior art as of Nov. 28, 2017).

TE Connectivity, "Exhibit D" (admitted prior art as of Nov. 28, 2017).

TE Connectivity, "Exhibit E" (admitted prior art as of Nov. 28, 2017).

TE Connectivity, "Exhibit F" (admitted prior art as of Nov. 28, 2017).

TE Connectivity, "Exhibit G" (admitted prior art as of Nov. 28, 2017).

TE Connectivity, "Exhibit H" (admitted prior art as of Nov. 28, 2017).

TE Connectivity, "Exhibit I—OFDC-DS2" (admitted prior art as of Nov. 28, 2017).

TE Connectivity, "Exhibit J—FOSC-400C-006" (admitted prior art as of Nov. 28, 2017).

TE Connectivity, "Exhibit K—FOSC-400D" (admitted prior art as of Nov. 28, 2017).

TE Connectivity, "Exhibit L—FOSC-600C" (admitted prior art as of Nov. 28, 2017).

Tyco Electronics, "OFDC-A4, Outdoor fiber distribution closure", Jan. 3, 2010.

Indian Examination Report for Application No. 202017021914 dated May 6, 2022.

\* cited by examiner

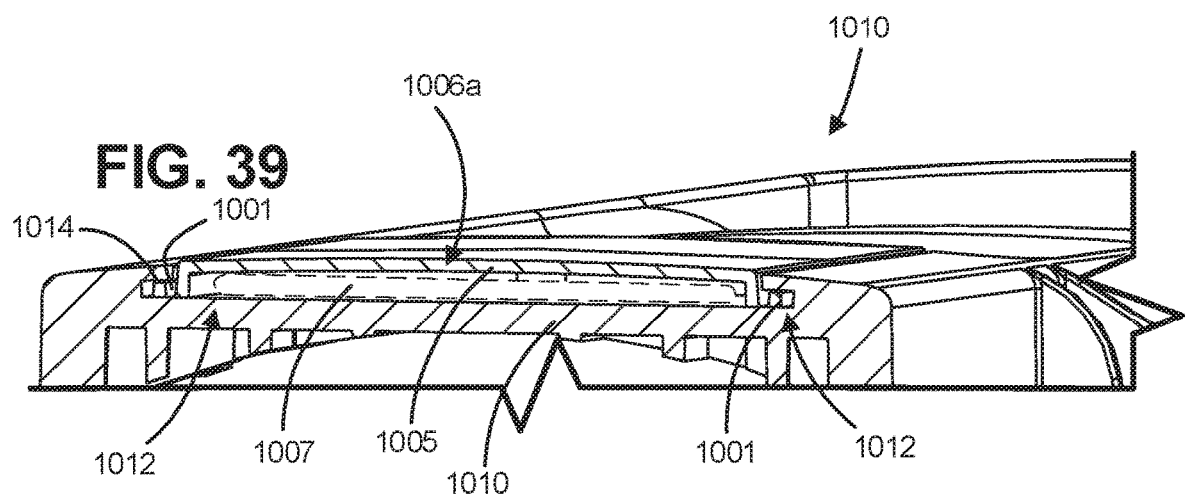
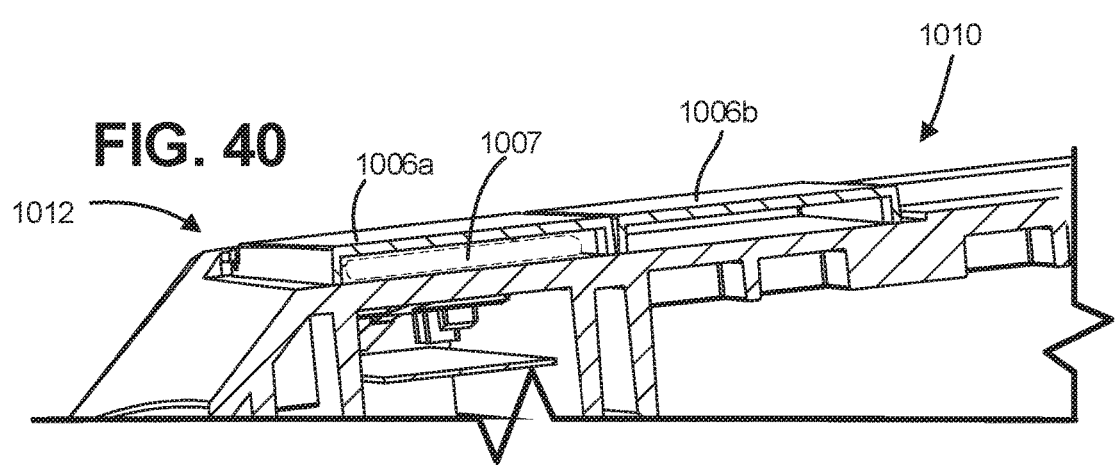

INDICIA AND METHOD FOR IDENTIFYING TELECOMMUNICATIONS COMPONENTS

This application is a National Stage Application of PCT/US2019/025022, filed on Mar. 29, 2019, which claims the benefit of U.S. Patent Application Ser. No. 62/649,765, filed on Mar. 29, 2018, and claims the benefit of U.S. Patent Application Ser. No. 62/727,807, filed on Sep. 6, 2018, and claims the benefit of U.S. Patent Application Ser. No. 62/748,022, filed on Oct. 19, 2018, and claims the benefit of PCT Patent Application No. PCT/US2018/062535, filed on Nov. 27, 2018, the disclosures of which are incorporated herein by reference in their entireties. To the extent appropriate, a claim of priority is made to each of the above disclosed applications.

BACKGROUND

Associating telecommunications components with their corresponding network operators is both important in the field and in a warehouse environment. In some examples, color-coding components facilitates easily identifying particular cables and enclosures. In addition, cable jackets can be color coded to distinguish various types of connectors, types of network connections, and types of cables. For example, the color of a cable or enclosure can indicate a type of connector, the level of security of the network connection, or the identity of the network in a multi-network environment.

In existing systems, the cables and connectors can be colored at the factory during manufacturing. For example, the connectors can be molded in various colors and cable jackets can be extruded in various colors. However, this does not offer a retrofit solution to preexisting installations and is not cost effective. Improvements are desired.

SUMMARY

Some aspects of the disclosure are directed to a system and a method of identifying network connection components including installing an indicia element onto telecommunication components.

In one aspect of the present disclosure, a telecommunications component is disclosed. The telecommunications component includes an outer housing that includes a badge holder. The badge holder is configured to receive a badge. The badge is configured to be inserted into the badge holder. The badge includes a feature that is identifying of the source of the telecommunications component and the feature is at least one of a logo, a specific color, text information, a barcode, a QR code, and a RFID tag. The badge includes a pair of arms extending from opposing sides to engage with the badge holder of outer housing. The badge includes a securing feature that is configured to secure the badge within the badge holder.

In another aspect of the present disclosure, a method of identifying network connection components is disclosed. The method includes installing a portion of a network using at least one telecommunications component having a non-indicative base color. The telecommunications component includes an outer housing including a badge holder. The badge holder is configured to receive a badge. The method includes installing a badge within the badge holder of the at least one telecommunications component to indicate a feature of the telecommunications component. The badge includes a feature that is identifying of the source of the telecommunications component and the feature is at least one of a logo, a specific color, text information, a barcode, a QR code, and a RFID tag. The badge includes a pair of arms that extend from opposing sides to engage with the holder of the outer housing. The badge includes a securing feature that is configured to secure the badge within the badge holder.

In another aspect of the present disclosure, a telecommunications component is disclosed. The telecommunications component includes an outer housing that includes a cover and a plurality of ports disposed on the cover. The outer housing includes a badge holder and the badge holder is configured to receive a badge. The badge holder is immediately adjacent at least one port. The telecommunications component includes the badge configured to be inserted into, and retained within, the badge holder. The badge includes indicia relating to an identity of at least one port of the plurality of ports. The badge includes a pair of arms extending from opposing sides to engage with the badge holder of outer housing. The badge includes a securing feature that is configured to secure the badge within the badge holder.

In another aspect of the present disclosure, an indicia element for a telecommunications system is disclosed. The indicia element includes a main body that includes indicia that is at least one of a logo, a specific color, text information, a barcode, a QR code, and a RFID tag. The indicia element includes a pair of arms that extend from opposing sides of the main body. Each arm is separated from the main body by at least one recess. Each arm has a badge holder engaging feature and each badge holder engaging feature is configured to mate with a corresponding badge engaging feature of a badge holder. The indicia element includes a recess at a rear side configured to receive an RFID tag therein.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 39 illustrates another perspective cross-sectional view along line 38-38 in FIG. 37.

FIG. 40 illustrates a perspective cross-sectional view along line 40-40 in FIG. 37.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an indicia element that can be added to a telecommunications component to identify the source of a telecommunications component. In accordance with some aspects, the indicia element aids in identifying or tracing network connections, and/or identifying telecommunications components that have certain connectors and/or cables, and/or labeling the network connections. In accordance with some aspects, the indicia element aids in identifying a network operator in a multi-network environment. The indicia elements disclosed herein can be of a variety of shapes and sizes. The indicia elements can include specific features such as, but are not limited to, a logo, a specific color (e.g. a color different from a non-indicative base color of the telecommunications component), text information, a barcode, a QR code, and a RFID tag. In accordance with some aspects of the disclosure, the telecommunications components are all manufactured in a common base color (e.g., white, black, gray, etc.). The base color is not indicative of any feature of the telecommunications components. A colored indicia element is subsequently added (e.g., during or post installation) to indicate one or more features (e.g., type, size, identity, etc.) of the telecommunications component.

Figure 1:
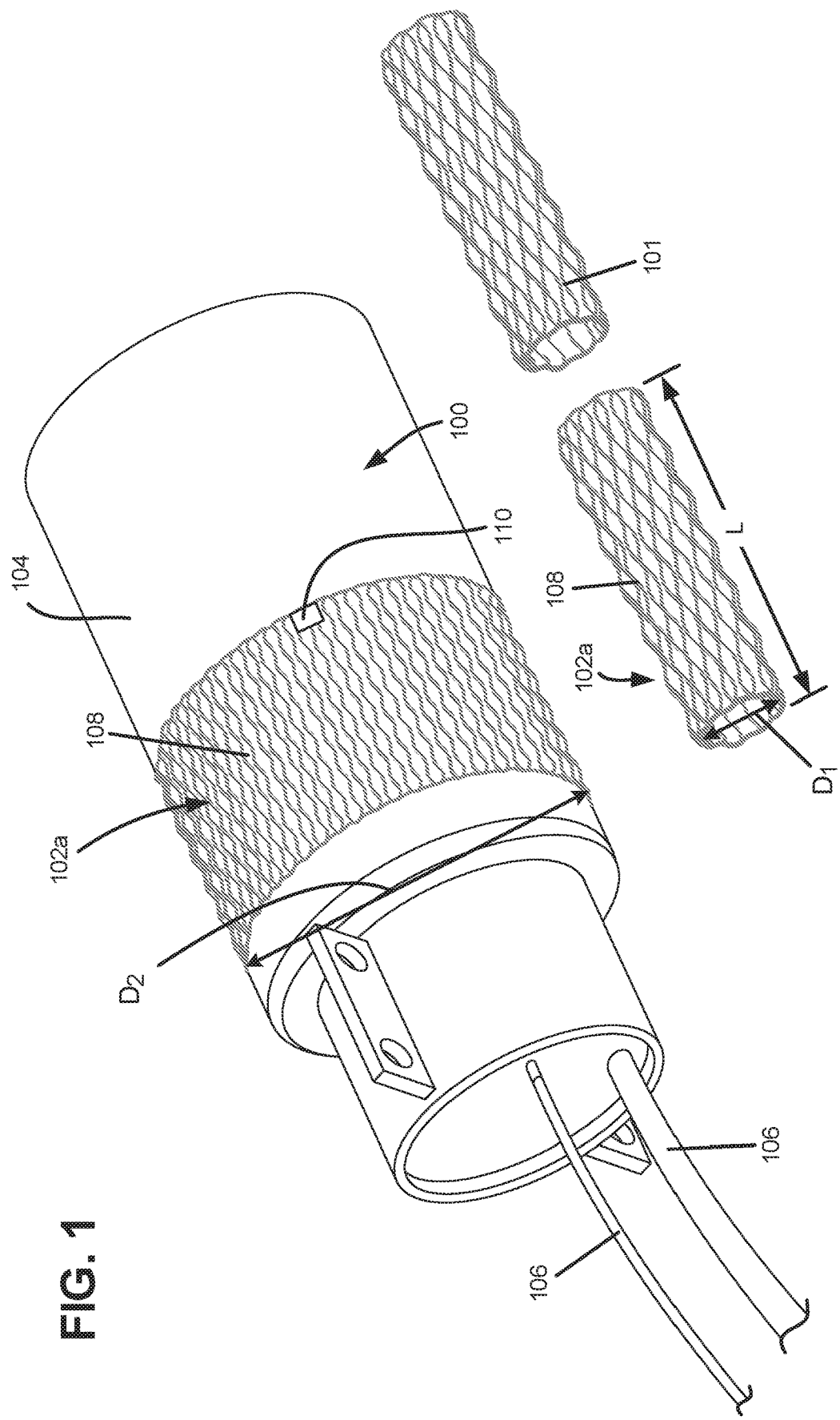
FIGS. 1 and 2 illustrate an example indicia element positioned around a telecommunications component, according to one embodiment of the present disclosure.
Figure 2:
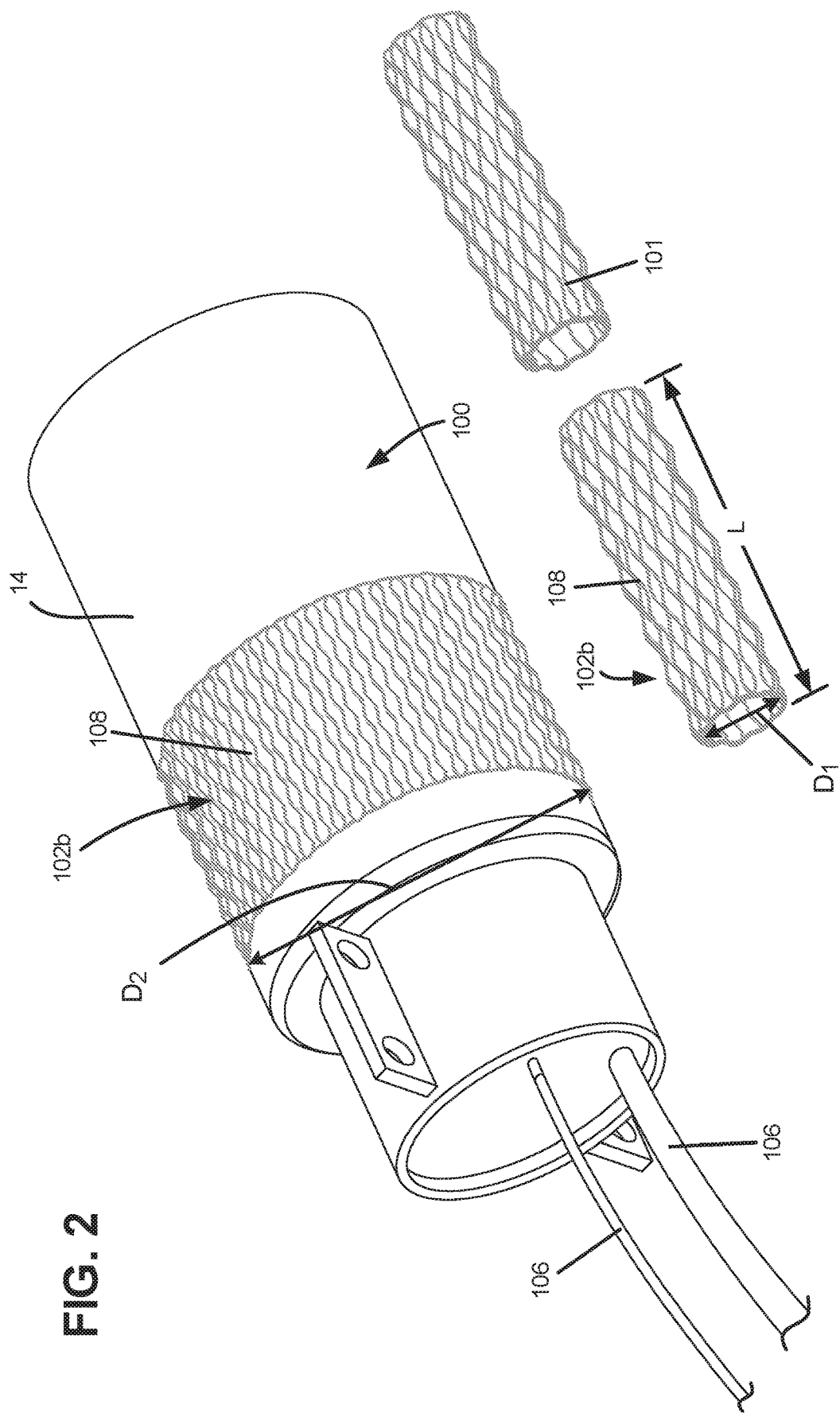
Figure 5:
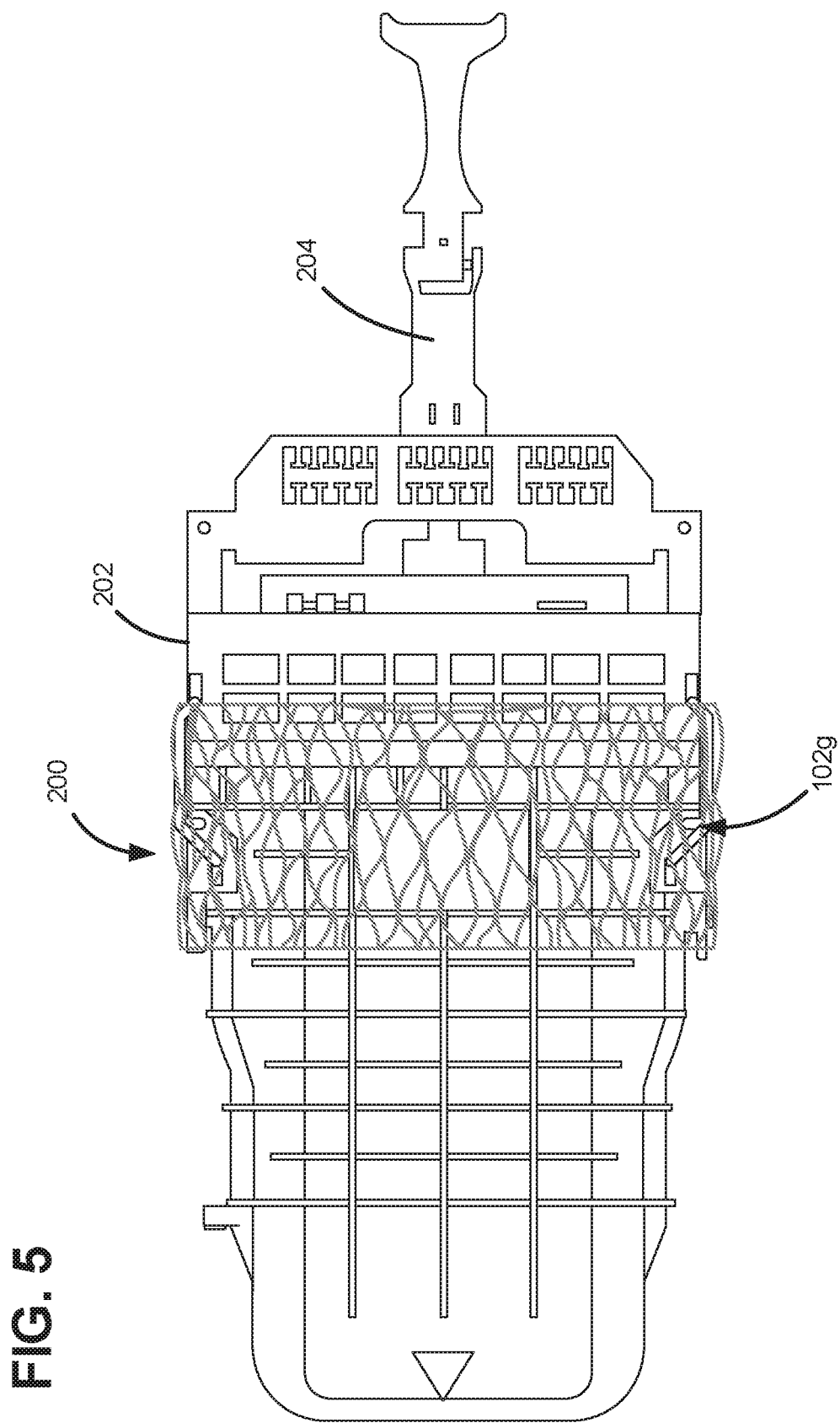
FIG. 5 illustrates another example of an indicia element positioned around a main body of a telecommunications component, according to one embodiment of the present disclosure.
Figure 6:
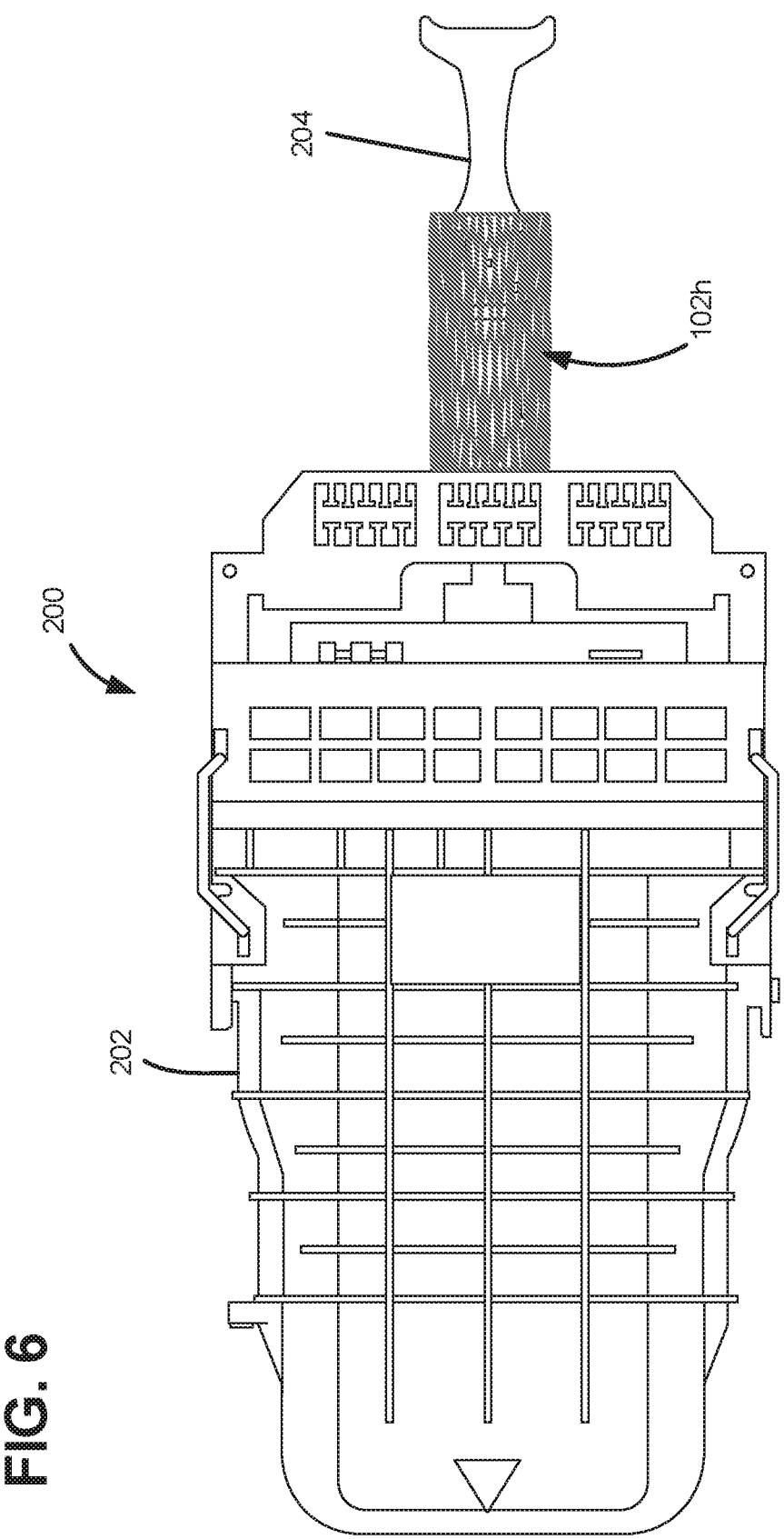
FIG. 6 illustrates another example of an indicia element positioned around a portion of a body of a telecommunications component, according to one embodiment of the present disclosure.
Figure 7:
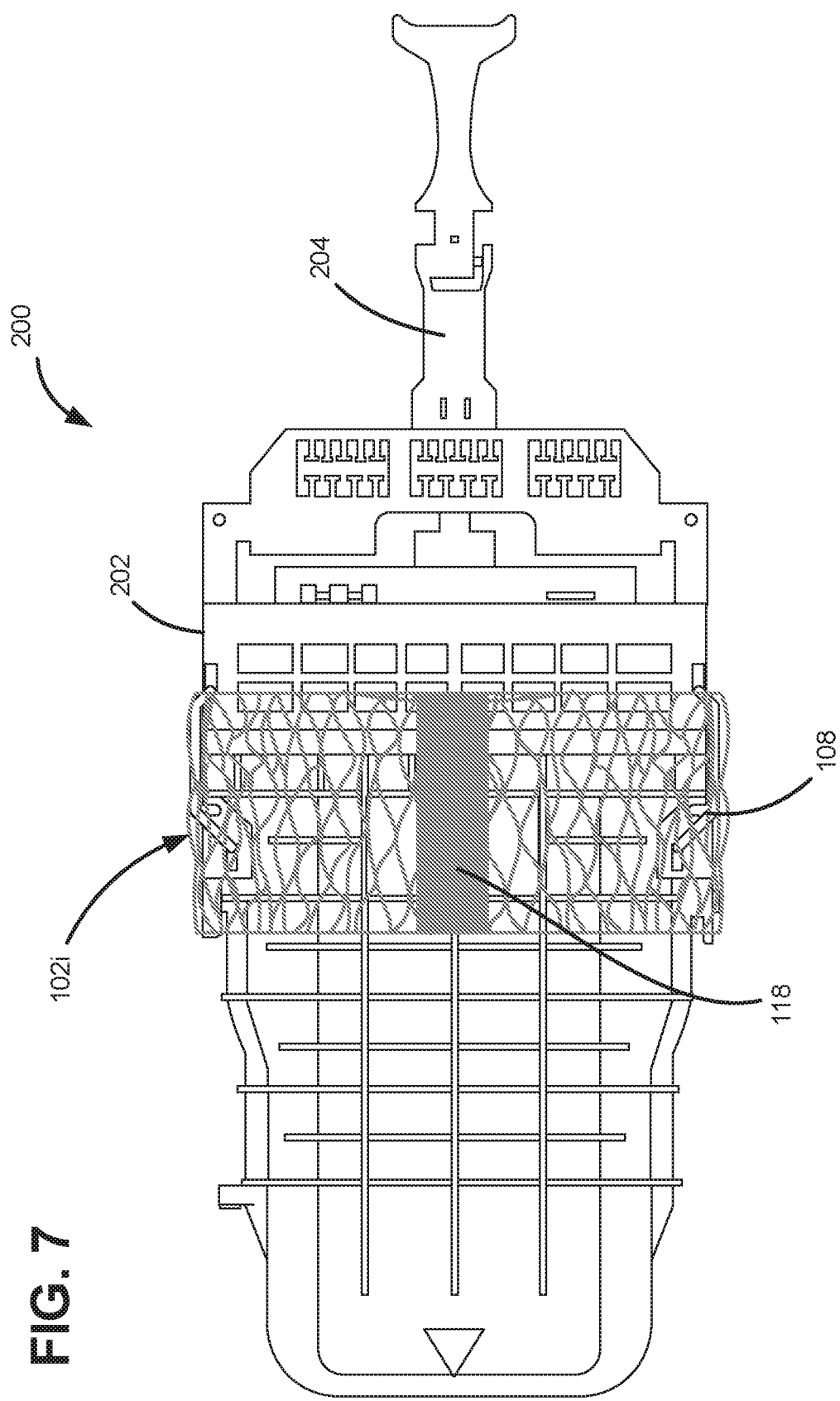
FIG. 7 illustrates an indicia element with a label portion positioned around the telecommunications component of FIG. 5.

FIGS. 1 and 2 illustrate example telecommunications components 100 that include indicia element 102 positioned there around. As shown, the telecommunications components are enclosures. However, it is considered within the scope of the present disclosure that telecommunications components 100 can be any of a variety of different components, or portions of components, used to install a telecommunications network. For example, the telecommunications component 100 can be an enclosure or a portion of an enclosure (as shown in FIGS. 5-7). Example telecommunications components are shown and described in U.S. Pat. Nos. 5,059,748; 8,989,550; and U.S. Pub. No. 2015/0137461 and are each hereby incorporated by reference in their entirety.

The indicia element 102 is positioned around the telecommunications component 100 to aid in differentiating the telecommunications component 100 from other, like, telecommunications components 100. The example indicia element 102 is disposed around the telecommunications component 100. In some examples, the indicia element 102 is a sleeve.

In the example shown in FIGS. 1 and 2, the indicia element 102 is positioned around a main body 104 of the telecommunications component 100. In some examples, the telecommunication component 100 is an enclosure (e.g. a dome, box, cabinet, etc.). In some examples, the telecommunications component 100 is a cable. In some examples, the telecommunications component 100 can have the main body 104 which can be a lid, cover, or other similar structure. In some examples, the telecommunications component 100 can have a plurality of cables 106 entering and leaving the telecommunications component 100.

As depicted in FIGS. 1 and 2, the indicia element 102 can be color coded to allow a user to readily visually differentiate between other like telecommunications components 100. In FIG. 1, the indicia element 102a is shown to be a first color (i.e., green), while the indicia element 102b in FIG. 2 is shown to be a second color (i.e., orange). Each of the indicia elements 102 can be manufactured (e.g., molded, extruded, etc.) in one or more desired colors.

The indicia element 102 is shown to be a fixed length L so that it can be installed on a variety of differently sized and shaped telecommunications components 100. In some examples, the indicia element 102 can be trimmed during installation to pieces 101 each having a shorter length to fit a variety of different telecommunications components 100. The indicia element 102 is configured to be installed around a new telecommunications component 100 or a previously installed telecommunications component 100, therefore providing the user with maximum flexibility. For example, the user can retrofit the indicia element 102 onto a preexisting telecommunications component 100 while also installing an indicia element 102 on a to-be-installed component within the same environment.

In some examples, the indicia element 102 has a tubular shape when not installed. In other examples, the indicia element 102, when not installed, is a sheet. When shaped like a tube, the indicia element 102 can be slid over, and positioned around, telecommunications components 100. In some examples, the indicia element 102 can be expandable from a first dimension D1 to a second dimension D2 to fit over and grasp the telecommunications component 100. In some examples, the indicia element 102 can grasp or grip the telecommunications component 100 so that it stays in a particular location on the telecommunications component 100.

When the indicia element 102 is a sheet, the indicia element 102 can be wrapped around a telecommunications component 100 and fixed together (e.g., welded or fastened using a fastener) to form a tube (i.e., sleeve). In some examples, the indicia element 102 can have elastic qualities so the indicia element 102 can expand and contract to surround a variety of differently shaped and sized telecommunications components 100. In some examples, the indicia element 102 is manufactured from either high or low density polyethylene.

As depicted, the indicia element 102 can include a plurality of strands 108 that together form a net-like shape. In some examples, the strands 108 are interconnected, while still allowing the user to visually discern the telecommunications component the indicia element 102 is positioned around. In other examples, the indicia element 102 can include portions that are solid and not net-like (see FIG. 7). In other examples, the indicia element 102 can include a solid sheet-like construction having no individual strands (see FIGS. 8-10). In some examples, the indicia element 102 can be manufactured using an extrusion process.

In some examples, the indicia element 102 can include a fixing feature 110. The fixing feature 110 is configured to couple the indicia element 102 with the telecommunications component 100 to fix the indicia element 102 relative to the telecommunications component 100. This can prevent unwanted removal of the indicia element 102 from the telecommunications component 100 or movement of the indicia element 102 on the telecommunications component 100 (i.e., migrating along the length of a cable). In some examples, the fixing feature 110 is an adhesive. In some examples, the fixing feature 110 is an adhesive that can be readily applied in the field without the need for extra supplies. In some examples, the fixing feature 110 can be manufactured as part of the indicia element 102. In other examples, the fixing feature 110 is a fastener that is coupled to both the indicia element 102 and the telecommunications component 100. In other examples, the fixing feature 110 is a gripping coating on the inside surface of the indicia element that interfaces with the telecommunications component 100. In some examples, the gripping coating can be a rubber-like material.

Figure 3:
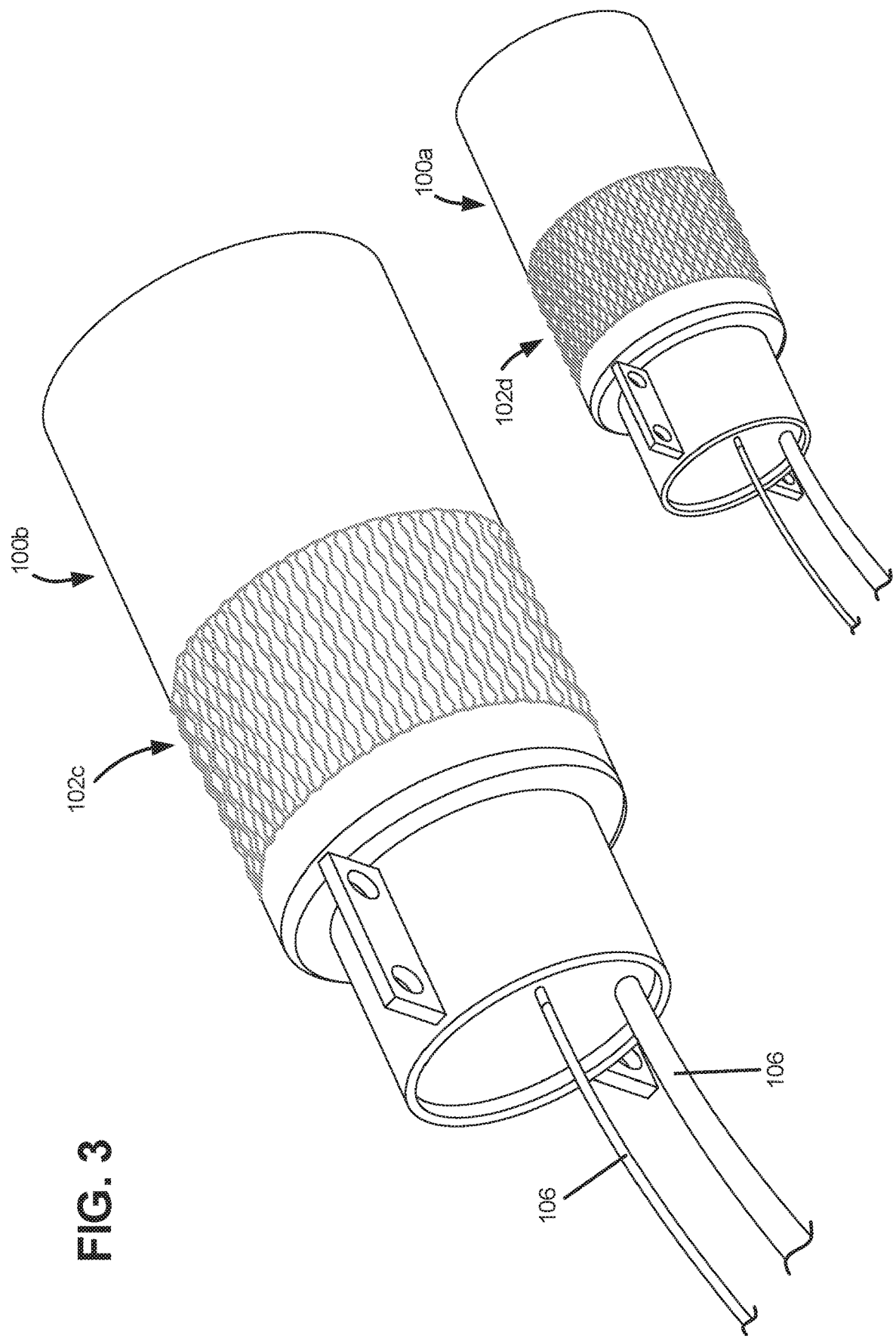
FIG. 3 illustrates a range of sizes of the indicia element shown in FIG. 1.

FIG. 3 shows a pair of telecommunications components 100a, 100b having two different sizes (i.e., diameters). As shown, indicia elements 102c, 102d can be sized and shaped to be positioned around both of the telecommunications components 100a, 100b, regardless of size. In some examples, the indicia element 102 can be manufactured in a variety of different sizes such as small, medium, or large to accommodate a variety of different telecommunications components (i.e., different sizes allows positioning on differently sized cables and enclosures).

Figure 4:
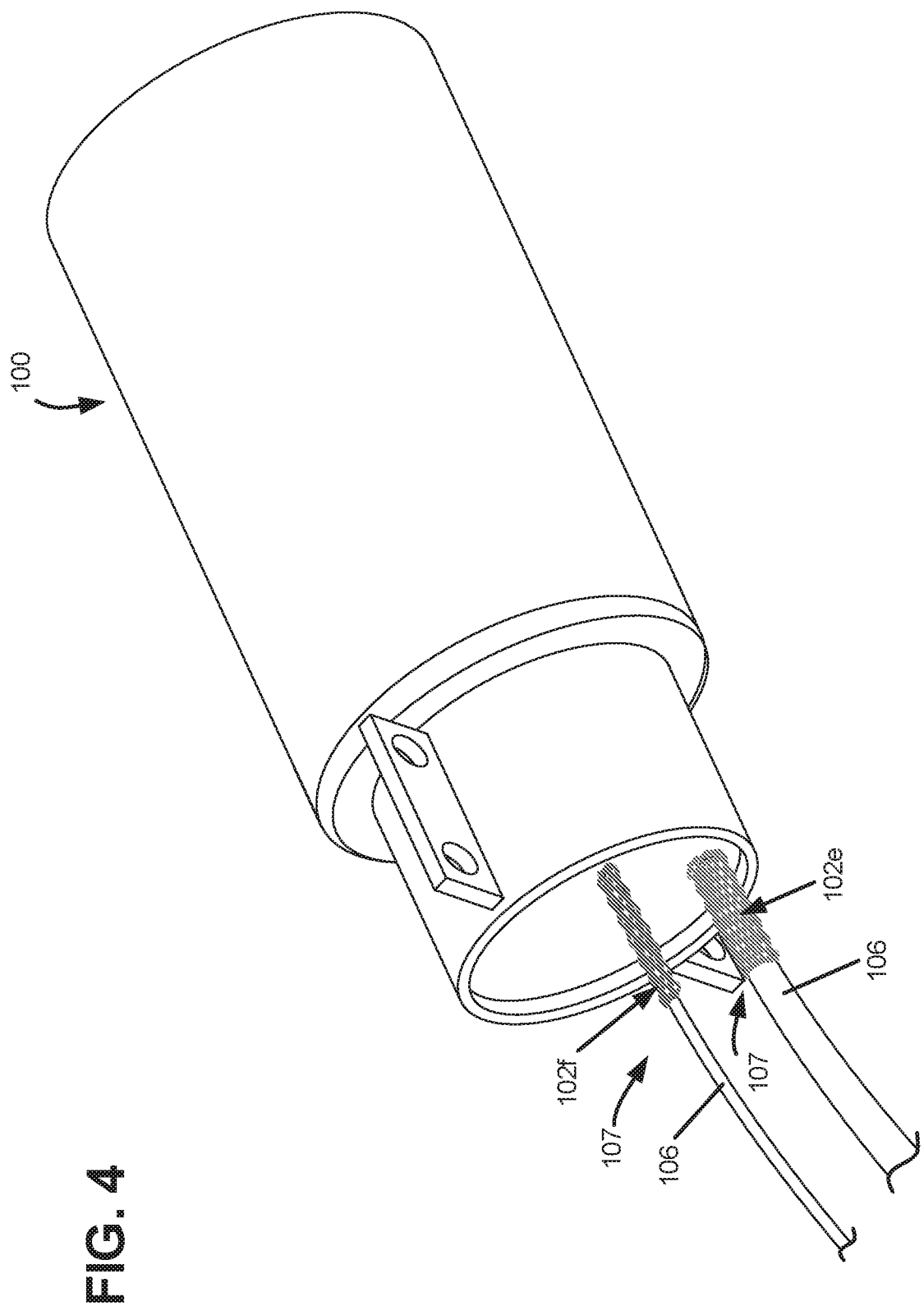
FIG. 4 illustrates an example indicia element positioned around a telecommunications component, according to one embodiment of the present disclosure.

FIG. 4 shows the telecommunications where indicia elements 102e, 102f are positioned around the cables 106. The indicia elements 102e, 102f are substantially similar to the indicia elements 102a-102d described above and are color-coded to differentiate between telecommunications components 100. For example, each cable 104 can have a different network identity and therefore a different indicia element 102 can be assigned to each cable 106. The indicia element 102 allows the user to easily discern which cable 106 belongs to which network based on a particular color of each indicia element 102. In some examples, the indicia element 102 can be slid over, or wrapped around, each cable 106. In some examples, the indicia element 102 can be positioned near an end 107 of each cable 106, adjacent a telecommunications component 100 (e.g., an enclosure). In some examples, the indicia element 102 can be positioned along any portion of the length of the cable 106.

FIGS. 5-7 show another example of the telecommunications component 200 with the indicia element 102 positioned therearound. In the depicted example, the telecommunications component 200 is an enclosure for housing other telecommunications components. As shown, the telecommunications component 200 includes a main body 202. In the example depicted in FIGS. 5 and 7, an indicia element 102g is positioned around the main body 202. In the example depicted in FIG. 6, an indicia element 102h is positioned around a portion 204 of the telecommunications component 200. In some examples, the portion 204 is a seal trigger to activate at least one seal within the telecommunications component 200.

In the example shown in FIG. 7, an indicia element 102i includes at least one label portion 118. The label portion 118 can be a portion that is configured to receive a label. In some examples, the user can hand write the label on the label portion 118. In other examples, the label portion 118 is configured to receive a printed label. In some examples, the label portion 118 does not include strands 108, but instead presents a generally smooth surface sufficient for receiving a label.

Figure 8:
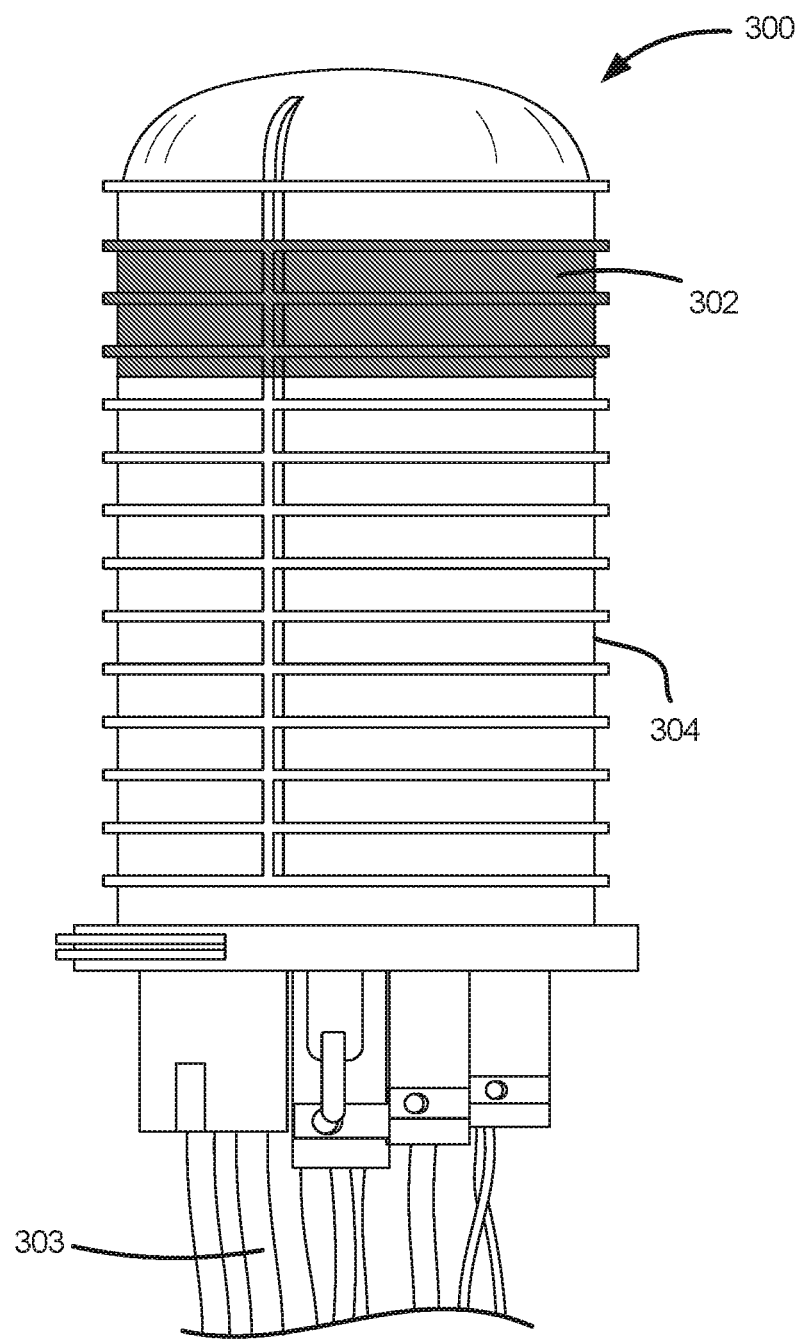
FIG. 8 illustrates another example of an indicia element positioned around a main body of a telecommunications component, according to one embodiment of the present disclosure.
Figure 9:
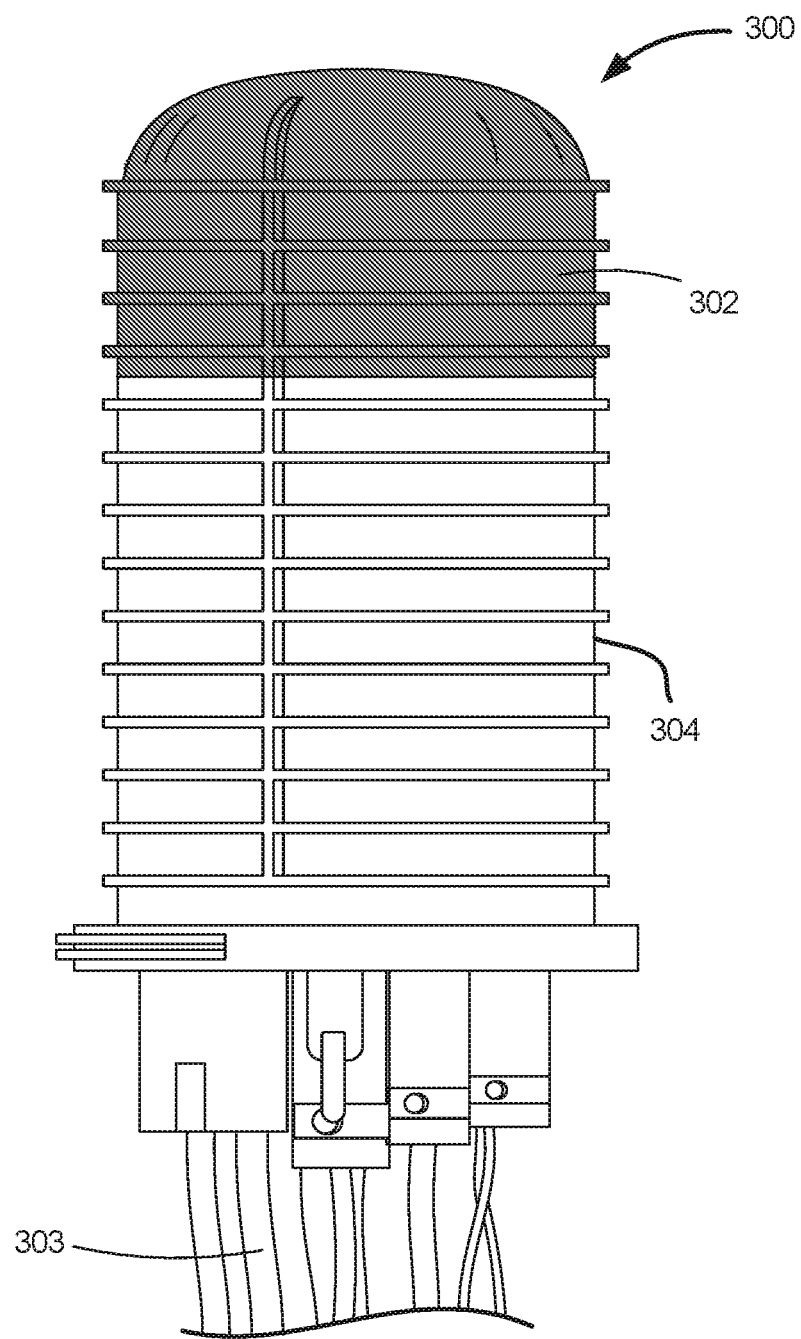
FIG. 9 illustrates another example of an indicia element positioned around a portion of a body of a telecommunications component, according to one embodiment of the present disclosure.
Figure 10:
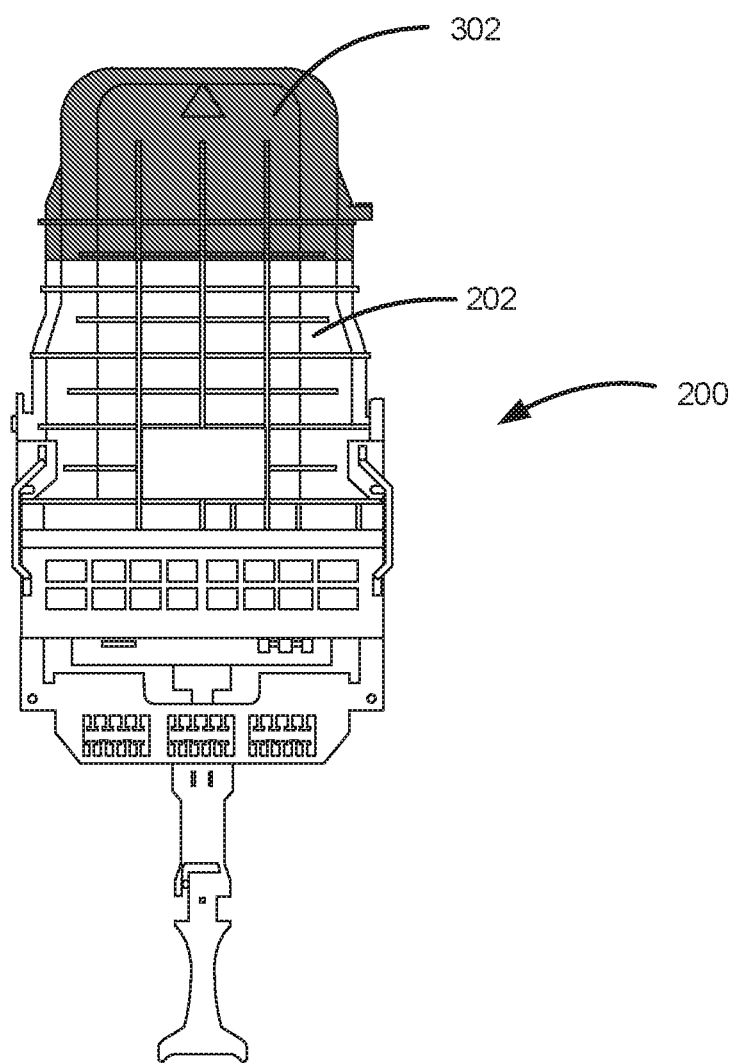
FIG. 10 illustrates another example an indicia element positioned around the telecommunications component of FIG. 5.

FIGS. 8-10 show an indicia element 302 positioned around another example telecommunications component 300. In the depicted example, the telecommunications component 300 is a dome-like enclosure for housing other telecommunications components and having a plurality of cables 303 enter and exit the telecommunications component 300. In the depicted example, the indicia element 302 is positioned around a main body 304 of telecommunications component 300. In some examples, the main body can be a lid, cover, or other like structure.

The indicia element 302 is substantially similar to the indicia element 102 described above. As shown, the indicia element 302 can be adapted to be positioned around a variety of different telecommunications components (i.e., enclosure, dome, etc.). In some embodiments, the indicia element 302 has elastic properties so that the indicia element 302 can be stretched to fit a variety of different telecommunications components 100. In some embodiments, the indicia element 302 can be constructed of a rubber-based material. In some examples, the indicia element 302 can be an elastic band. In other examples, the indicia element can be an elastic cap, as shown in FIG. 9. FIG. 10 shows the indicia element 302 positioned around the telecommunications component of FIG. 5.

Figure 11:
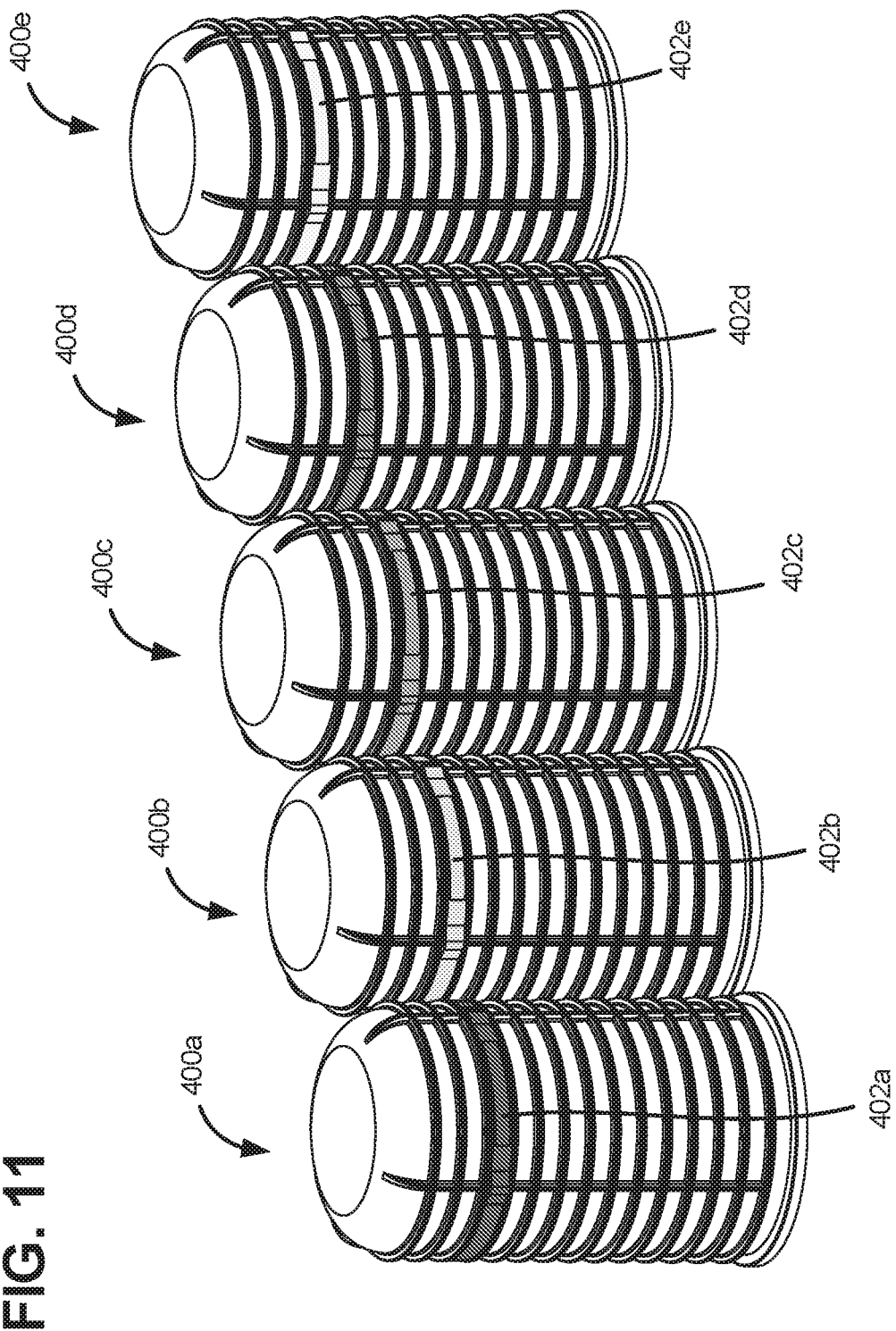
FIG. 11 illustrates a perspective view of another example of a plurality of indicia elements secured to a plurality of telecommunications components.

FIG. 11 shows a perspective view of a plurality of telecommunications components 400a, 400b, 400c, 400d, 400e, each having an indicia element 402a, 402b, 402c, 402d, 402e. Like the indicia elements 102, 302 described above, the indicia element 402 of each telecommunication components 400 can be color coded to allow a user to readily visually differentiate between other like telecommunications components. In FIG. 11, the indicia element 402a is shown to be a first color (e.g., black), the indicia element 402b is shown to be a second color (e.g., yellow), the indicia element 402c is shown to be a third color (e.g., blue), the indicia element 402d is shown to be a fourth color (e.g., green), and the indicia element 402e is shown to be a fifth color (e.g., grey). Each of the indicia elements 402 can be manufactured (e.g., molded, extruded, etc.) in one or more desired colors.

Figure 12:
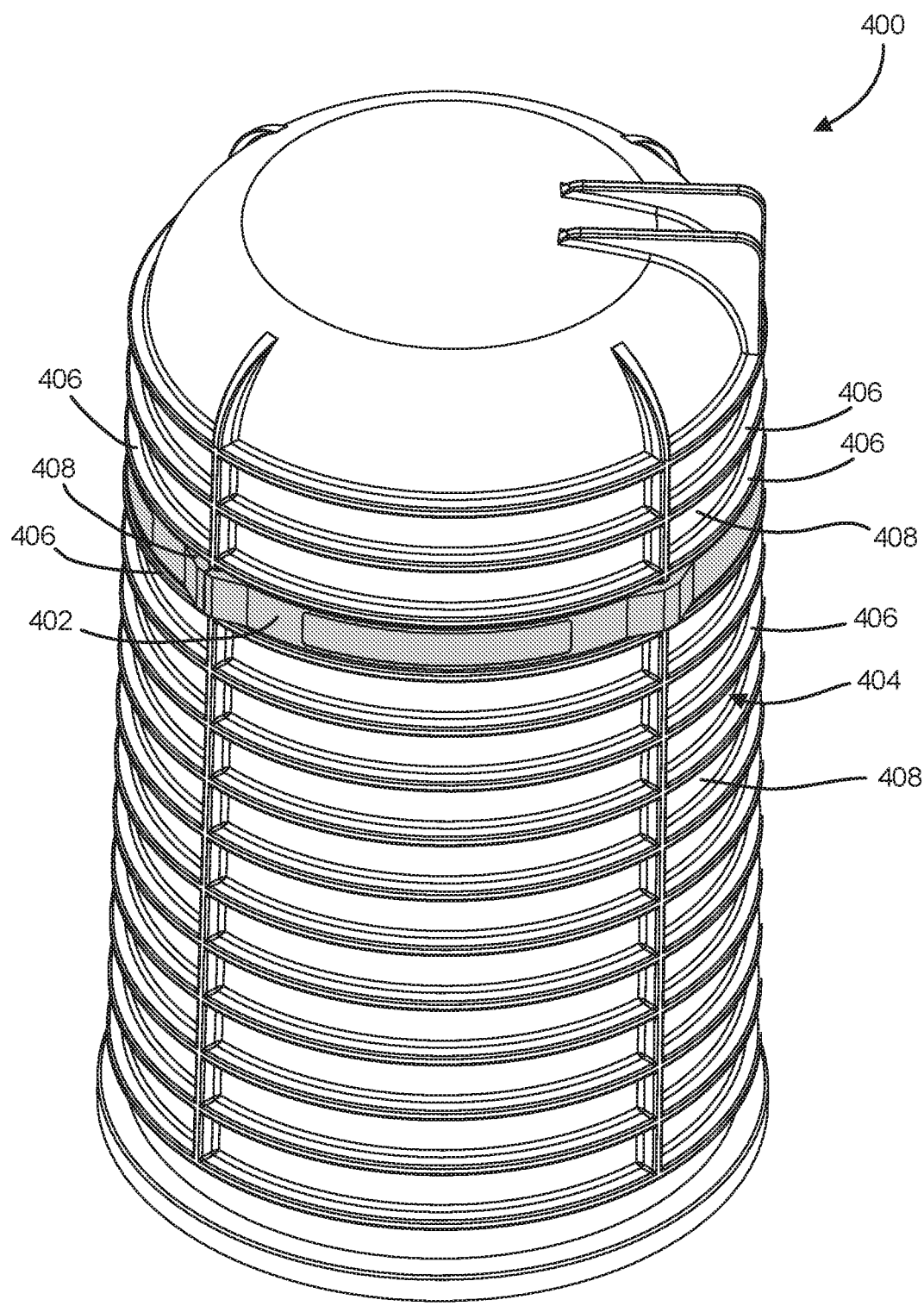
FIG. 12 illustrates a perspective view of a single indicia element positioned around a single telecommunications component of FIG. 11.

FIG. 12 shows the individual telecommunications component 400 with the indicia element 402. As shown, the telecommunications component 400 is an enclosure that has a cover 404. In the depicted example, the telecommunications component 400 is a dome enclosure. In some examples, the cover 404 of the telecommunications component 400 can include a plurality of ribs 406. Each pair of ribs 406 defines a recess 408 between the ribs 406.

In the depicted example, the indicia element 402 is a band that at least partially surrounds, and is secured to, a portion of the telecommunications component 400. In some examples, the indicia element 402 is positioned around the cover 404 of the telecommunications component 400. In other examples still, the indicia element 402 is positioned within the recess 408 between ribs 406 of the cover 404.

Figure 13:
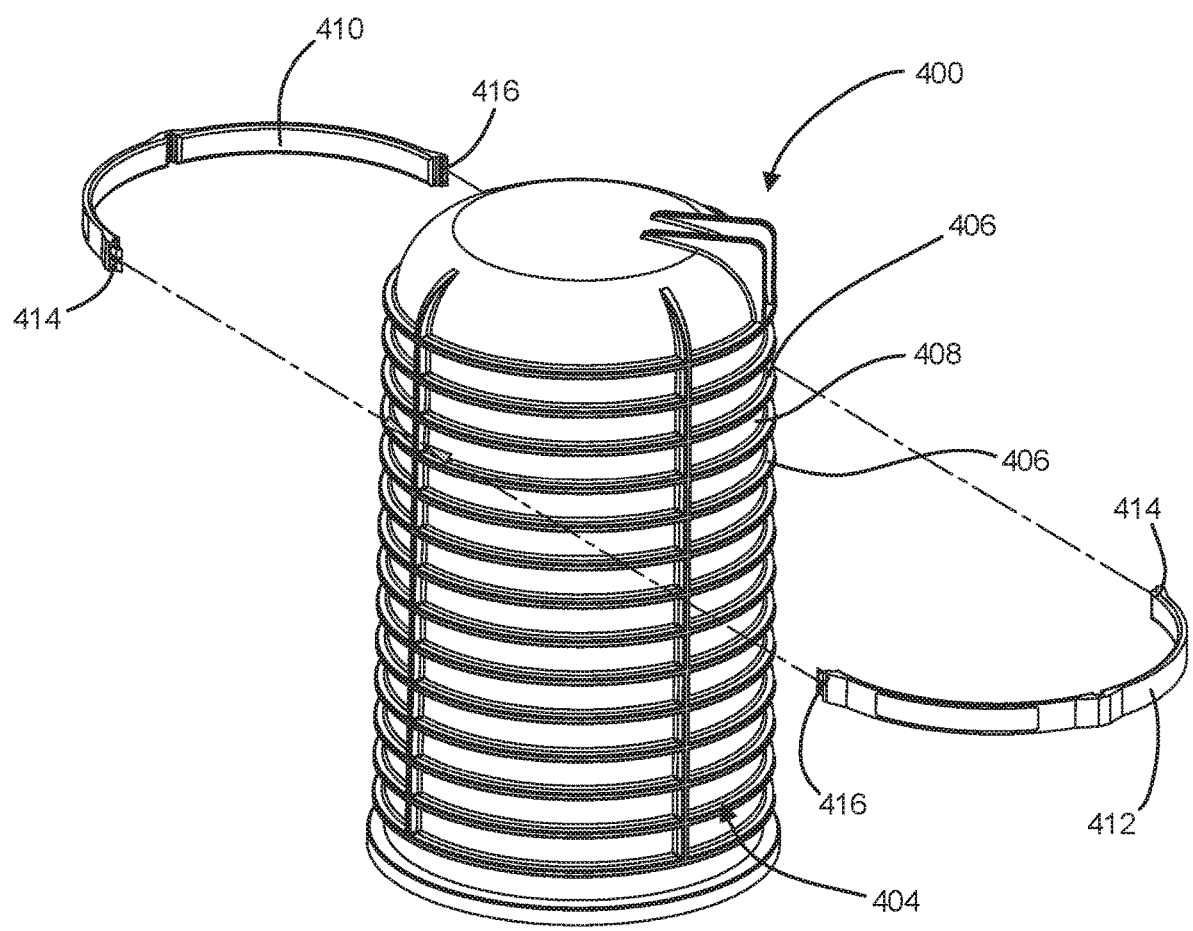
FIG. 13 illustrates a perspective view of the indicia element and the telecommunications component of FIG. 11 partially exploded from one another.

FIG. 13 shows the indicia element 402 exploded away from the telecommunications component 400. In some examples, the indicia element 402 can be a single continuous band that can be secured around a portion of the telecommunications component 400 (e.g., a band clamp and/or cable tie). In some examples, the indicia element 402 can include a first portion 410 and a second portion 412 that are configured to be attached to one another to form the complete indicia element 402. In some examples, the first and second portions 410, 412 can have corresponding projections 414 and recesses 416 that facilitate connecting the first and second portions 408, 410 to one another.

In some examples, once the projections 414 and recesses 416 of the first and second portions 410, 412 are mated with one another, the indicia element 402 must be irreparably damaged in order to separate the first and second portions 410, 412 from one another. For example, the projections 414 must be broken, or the first or second portions 410, 412 of indicia element 402 must be cut. In such an example, damaging the indicia element 402 would render the indicia element 402 unusable. This destructible nature prevents the removal of the indicia element 402 from one telecommunication component 400 and the installation of the same indicia element 402 on another telecommunications component 400. Further, in the depicted example, by positioning the indicia element 402 within the recess 408, tampering with the indicia element 402 is made difficult, and the ribs 406 at least partially protect the indicia element 402.

Figure 14:
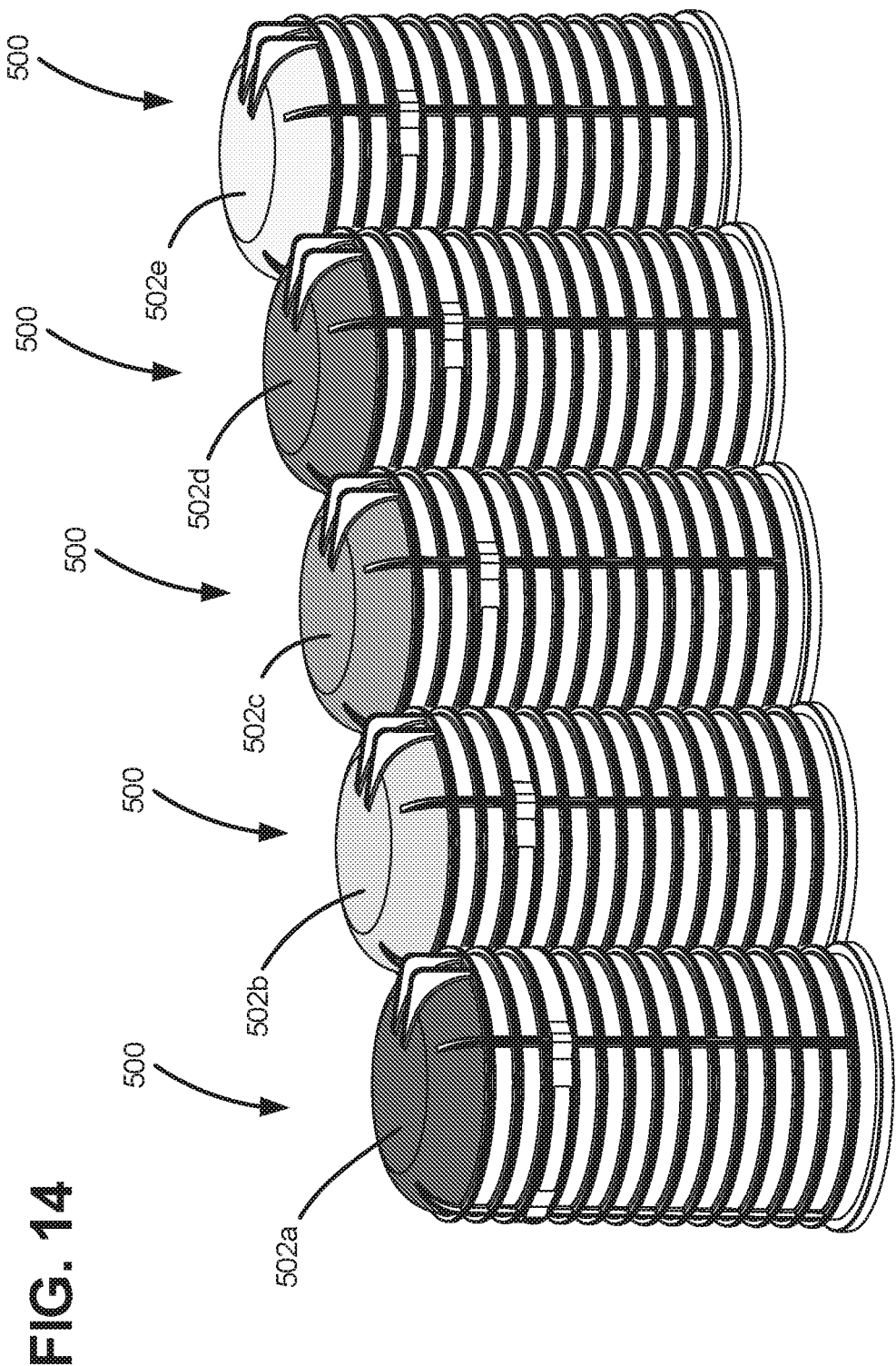
FIG. 14 illustrates a perspective view of another example of a plurality of indicia elements secured to a plurality of telecommunications components.

FIG. 14 shows a perspective view of a plurality of telecommunication components 500a, 500b, 500c, 500d, 500e, each having an indicia element 502a, 502b, 502c, 502d, 502e secured thereto. Like the indicia elements 102, 302, 402 described above, the indicia element 502 of each telecommunications component 500 can be color coded to allow a user to readily visually differentiate between other like telecommunications components.

Figure 15:
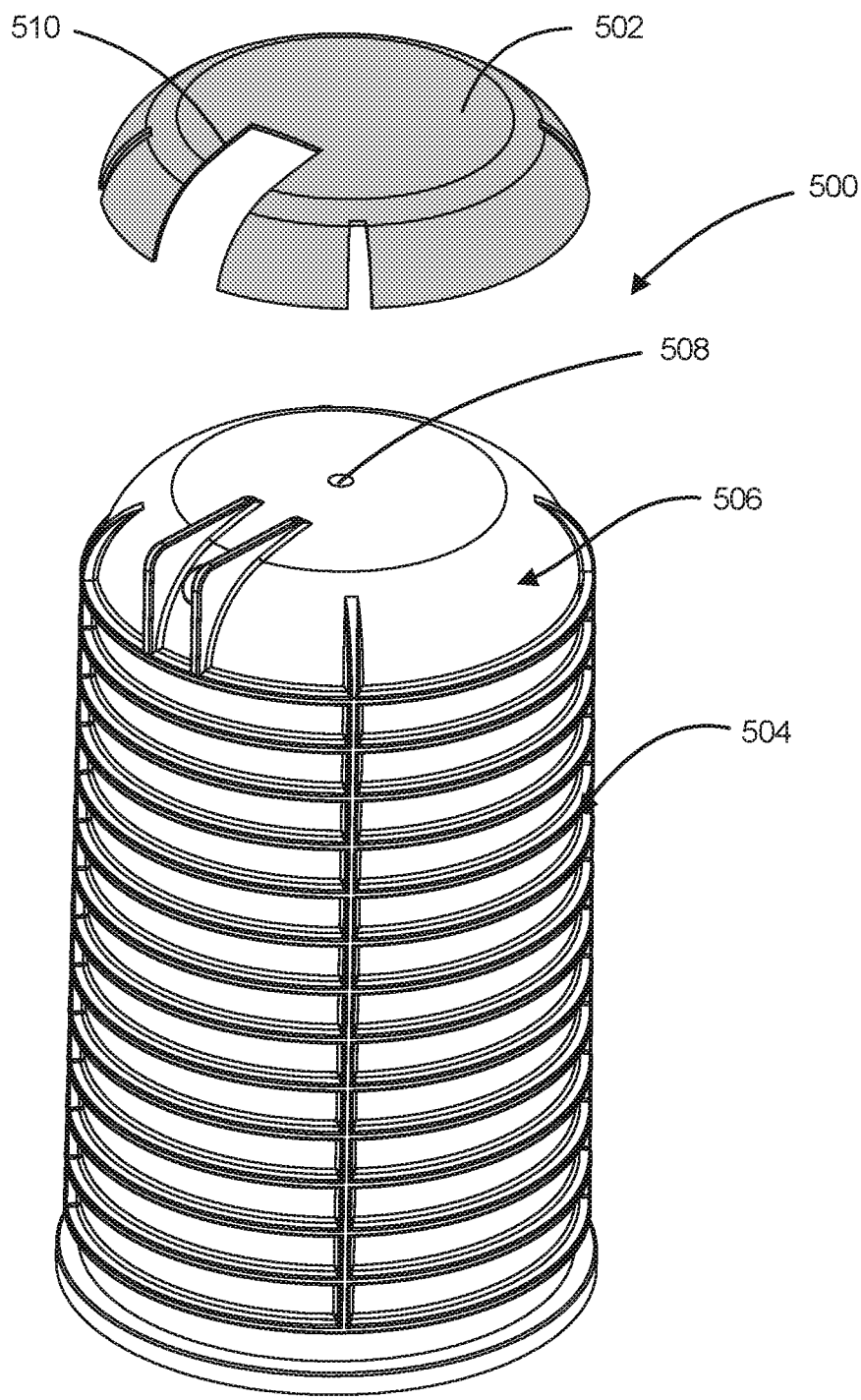
FIG. 15 illustrates a perspective view of the indicia element and the telecommunications component of FIG. 14 partially exploded from one another.

FIG. 15 shows the individual telecommunications component 500 with the indicia element 502. As shown, the telecommunications component 500 is an enclosure that has a cover 504. In the depicted example, the telecommunications component 500 is a dome enclosure. In some examples, the cover 504 of the telecommunications component 500 can have a domed top portion 506. In some examples, the domed top portion 506 includes an aperture 508 for receiving a portion of the indicia element 502.

The indicia element 502 is shown exploded away from the telecommunications component 500. In some examples, the indicia element 502 can be a cap that is positioned on the domed top portion 506 of the cover 504. In some examples, the indicia element 502 can include a plurality of slots and/or recesses 510 that are configured to receive corresponding features of the cover 504.

Figure 16:
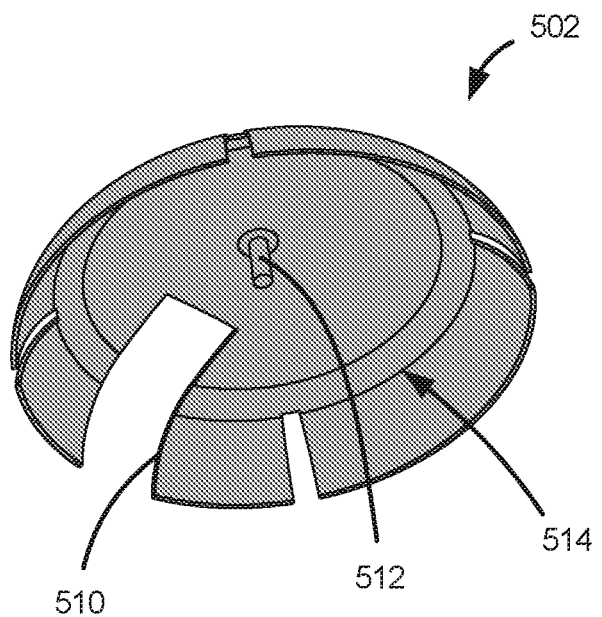
FIG. 16 illustrates a bottom perspective view of the indicia element of FIG. 14.

FIG. 16 shows a bottom perspective view of the indicia element 502. The indicia element 502 can include at least one projection 512 extending from an underside 514 of the indicia element 504. In some examples, the indicia element 502 can include a plurality of projections 512. The projection 512 is configured to be received by the cover 504, specifically the aperture 510. In some examples, the projection 510 is configured to be received within the aperture 510 to weatherproof the aperture 510 and thereby the telecommunications component 500. In some examples, the projection 512 can be molded into the underside 514 of the indicia element 502. In some examples, the projection 512 can be used with sealing elements to seal the aperture 510 when the projection 512 is positioned therein.

Like the indicia element 402 above, in some examples, the indicia element 502 is configured to become damaged if indicia element 502 is tampered with. In some examples, the indicia element 502 is configured to be irreparably damaged and will become unusable if tampered with. In some examples, if tampered with, the indicia element 502 will also render the telecommunications component 500 unusable. In some examples, the projection 512 is configured to break off within the aperture 510 during tampering, thereby preventing another indicia element 502 from being attached to the telecommunications component 500. In some examples, the projection 512 is configured to break a portion of the cover 504 during tampering, such as the area around the aperture 510, thereby rendering the telecommunication component permanently exposed and not weatherproof to elements (i.e., susceptible to water, dust, etc. ingress). Such exposure renders the telecommunications component 500 unusable.

Figure 17:
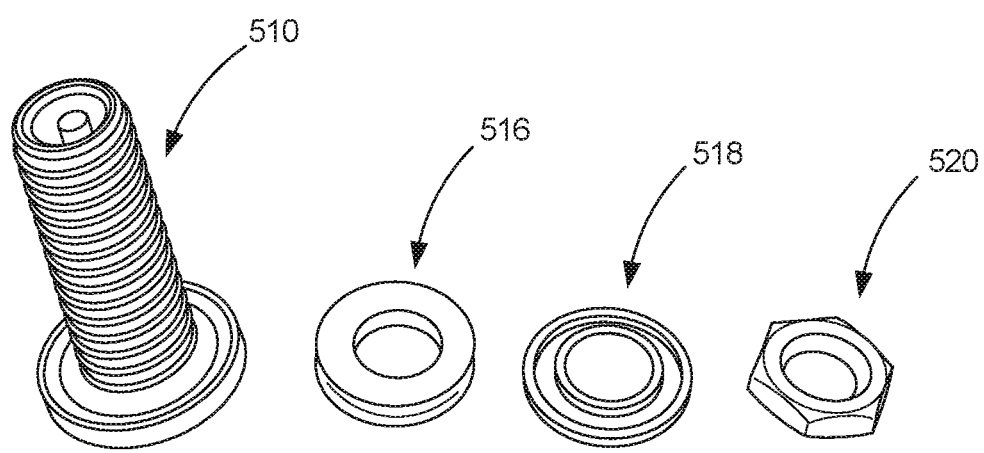
FIG. 17 illustrates a perspective view of an example projection of the indicia element of FIG. 14.

FIG. 17 shows an example of the projection 512, a seal 516, a washer 518, and a nut 520. In some examples, the seal 516, washer 518, and nut 520 are configured to be used in conjunction with the projection 512 to seal the aperture 510 in the cover 504 and to connect the indicia element 502 to the cover 504. In some examples, the projection 512 is a fastener such as a screw, bolt, rivet, etc. In some examples, the projection 510 is a rivet that is paired with at least one seal.

Figure 18:
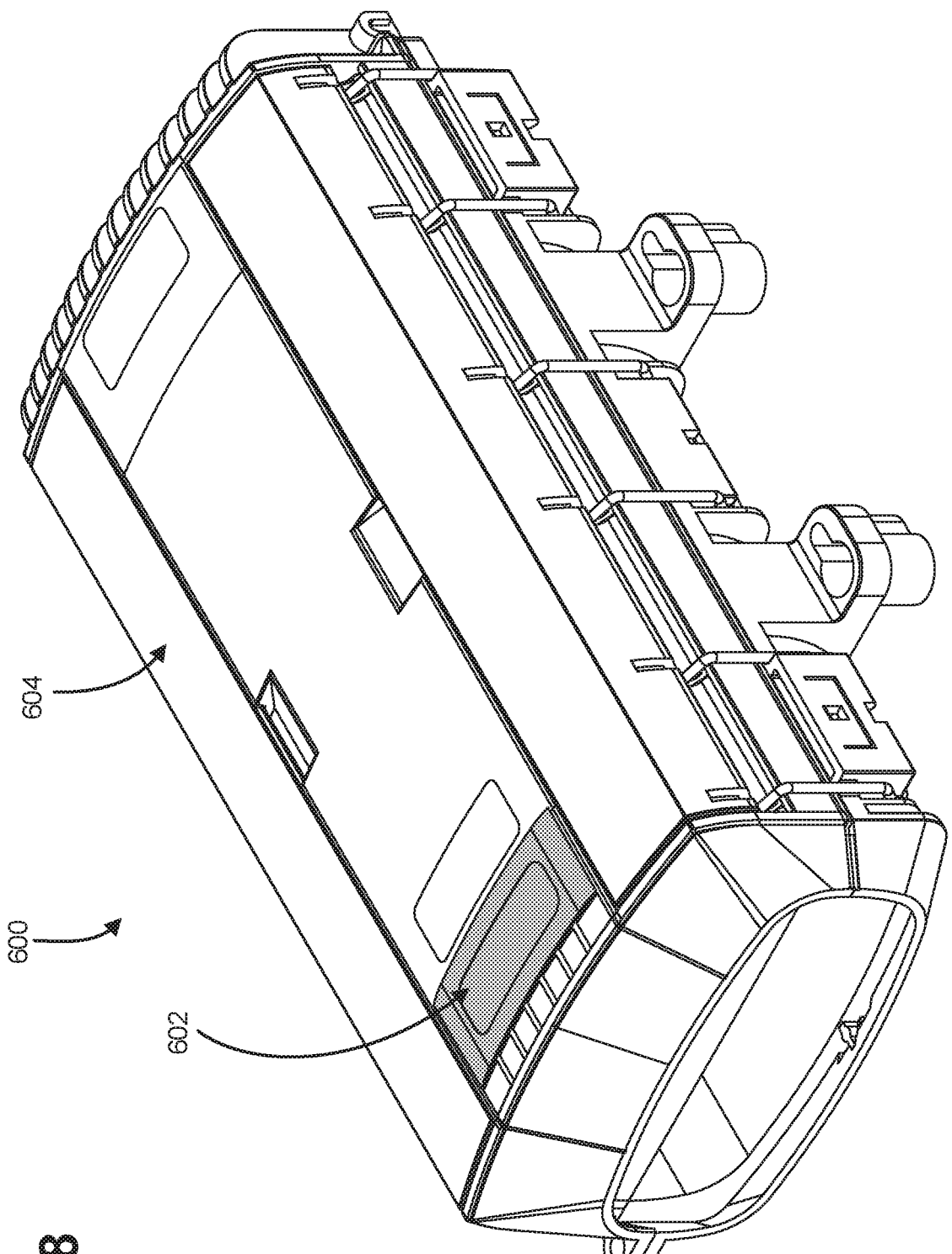
FIG. 18 illustrates a perspective view of another example of an indicia element secured to a telecommunications component.
Figure 19:
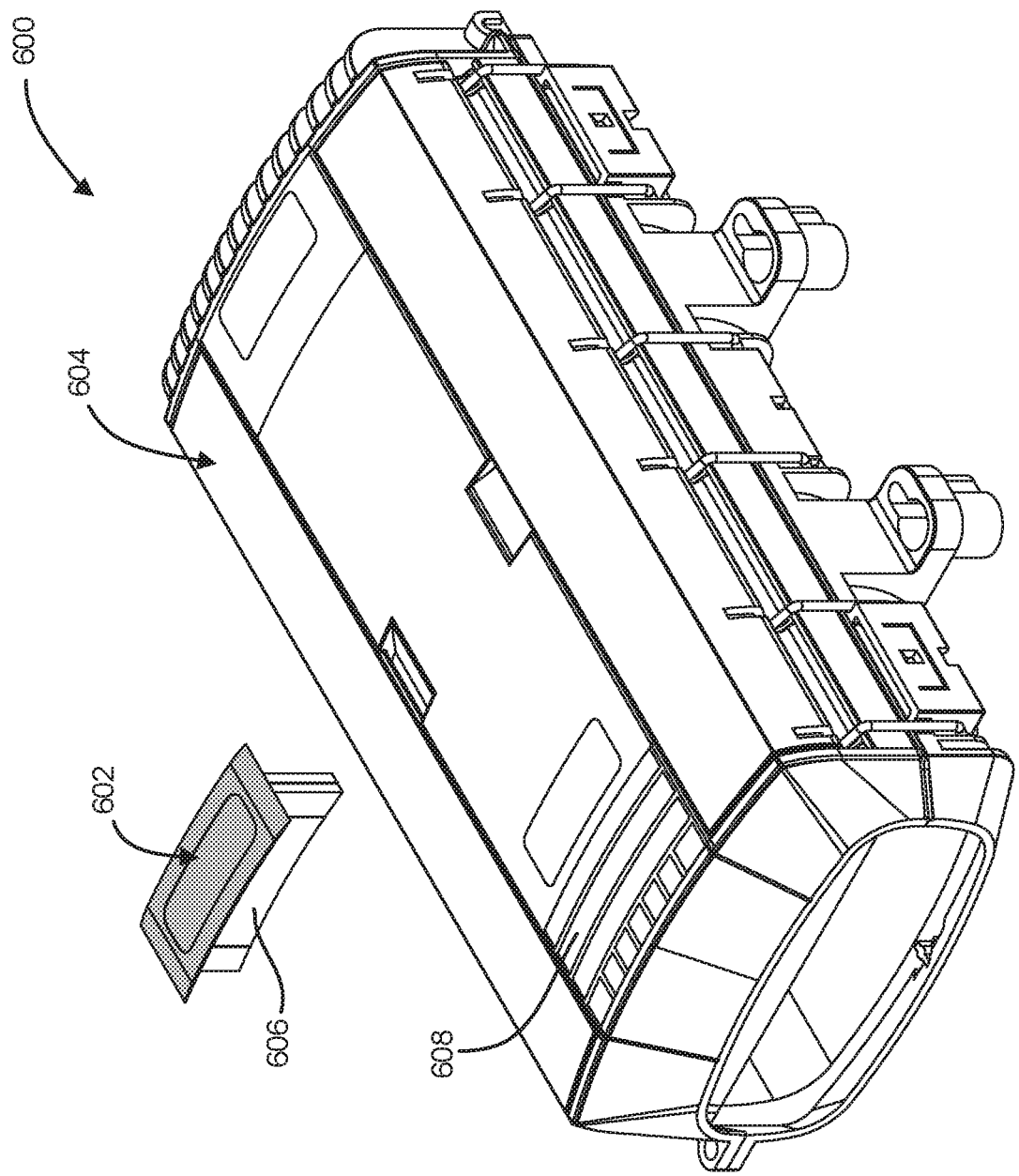
FIG. 19 illustrates a perspective view of the indicia element and the telecommunications component of FIG. 18 partially exploded from one another.

FIG. 18 shows another example of a telecommunications component 600 with an indicia element 602. FIG. 19 shows the indicia element 602 exploded away from the telecommunications component 600. As shown, the indicia element 602 is relatively small with respect to the overall size of telecommunications component 600, specifically the cover 604. In some examples, the indicia element 602 is less than half as tall of the overall length of the telecommunications component 600. In some examples, the indicia element 602 is less than a third as tall of the overall length of the telecommunications component 600. In some examples, the indicia element 602 is less than a quarter as tall of the overall length of the telecommunications component 600. As shown, the telecommunications component 600 is an enclosure that has a cover 604. In the depicted example, the indicia element 602 is a badge attached to the cover 604. In the depicted example, the indicia element 602 includes a projection 606 that is received by an aperture 608 of the cover 604. Like the indicia elements described above, the indicia element 602 can be configured to be irreparably damaged if the indicia element 602 is tampered with. In some examples, tampering with the indicia element 602 also renders the telecommunications component 600 unusable. The indicia element 602 can be color coded to allow a user to readily visually differentiate between other like telecommunications components.

Figure 20:
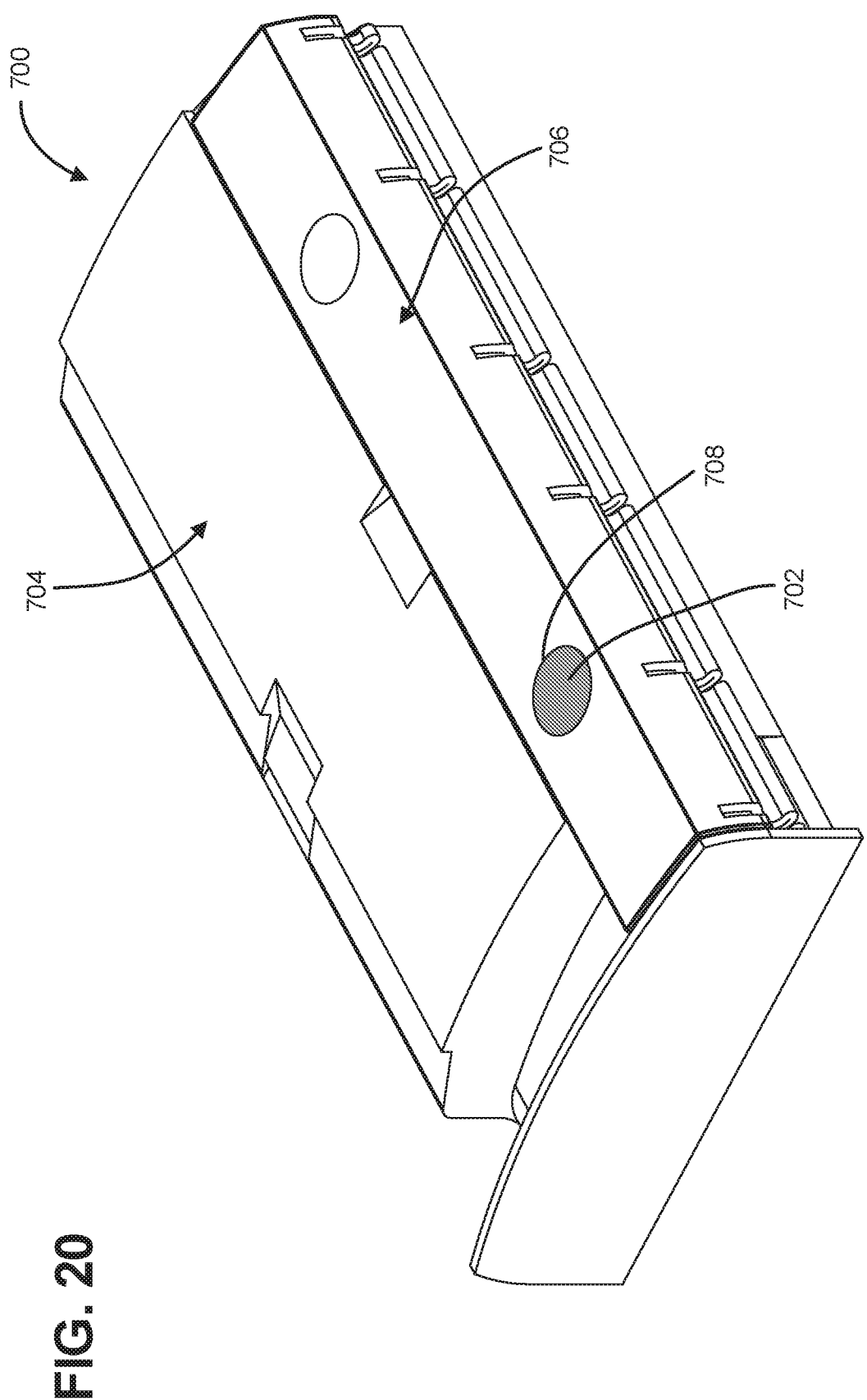
FIG. 20 illustrates a perspective view of another example of an indicia element secured to a telecommunications component.

FIG. 20 shows another example of a telecommunications component 700 with an indicia element 702. As shown, the telecommunications component 700 is an enclosure that has a cover 704 that is secured in a closed, sealed position by way of a latch 706. In the depicted example, the indicia element 702 is positioned within the latch 706.

Figure 21:
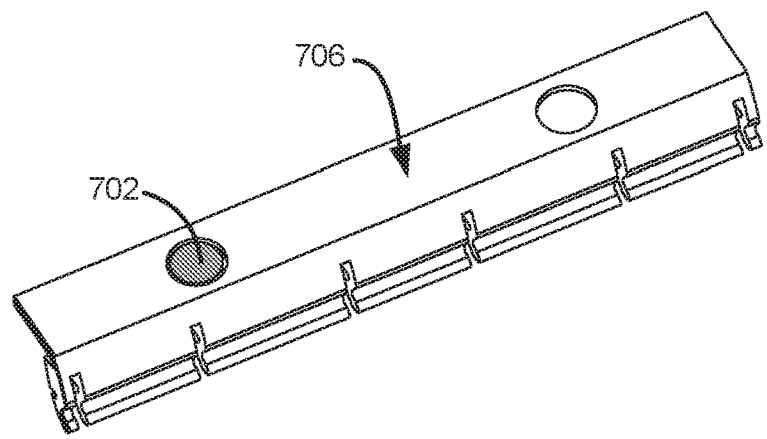
FIG. 21 illustrates a perspective view of the indicia element of FIG. 20.
Figure 22:
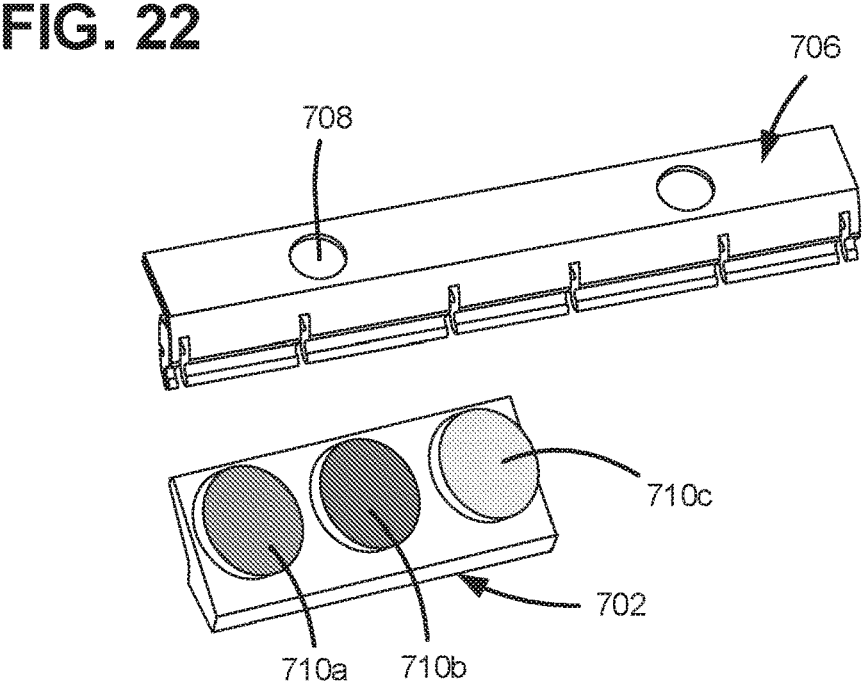
FIG. 22 illustrates a perspective view of the indicia element of FIG. 20 partially exploded.

FIG. 21 shows the latch 706 with the indicia element 702 positioned therein, removed from the telecommunications component 700. FIG. 22 shows the indicia element 702 removed from an aperture 708 defined by the latch 706. In some examples, the indicia element 702 includes a plurality of indicia 710a, 710b, 710c to allow a user to change the exposed indicia 710a, 710b, 710c of the telecommunication component 700. In some examples, only a single indicia 710a, 710b, 710c is received within the aperture 708, and therefore exposed, at a time. Each indicia 710a, 710b, 710c can be color coded to allow a user to readily visually differentiate between other like telecommunications components.

Figure 23:
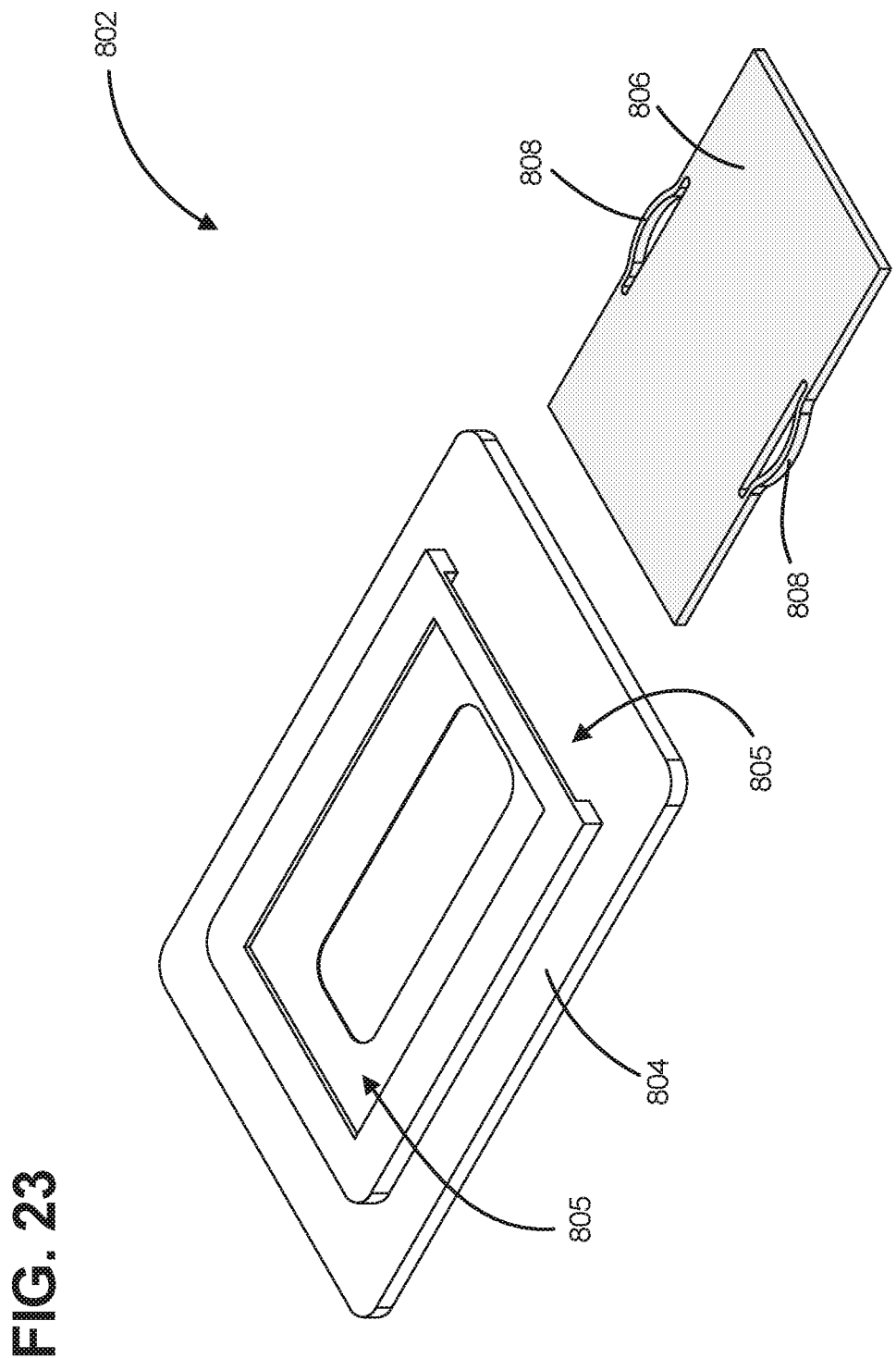
FIG. 23 illustrates a perspective view of another example of an indicia element.

FIG. 23 shows another example of an indicia element 802. The indicia element 802 can include a holder 804 and an indicia badge 806. In some examples, the indicia badge 806 includes projections 808 to retain the indicia badge 806 within a recess 805 of the holder 804. The indicia element 802 can be secured to any of a wide variety of telecommunications components. In some examples, the holder 804 is configured to be an integral part of the telecommunications component (i.e., an integral part of a cover or main body). The indicia badge 806 can be color coded to allow a user to readily visually differentiate between other like telecommunications components. In some examples, the indicia element 802 enters the holder 804 from an edge of the telecommunications component.

Figure 32:
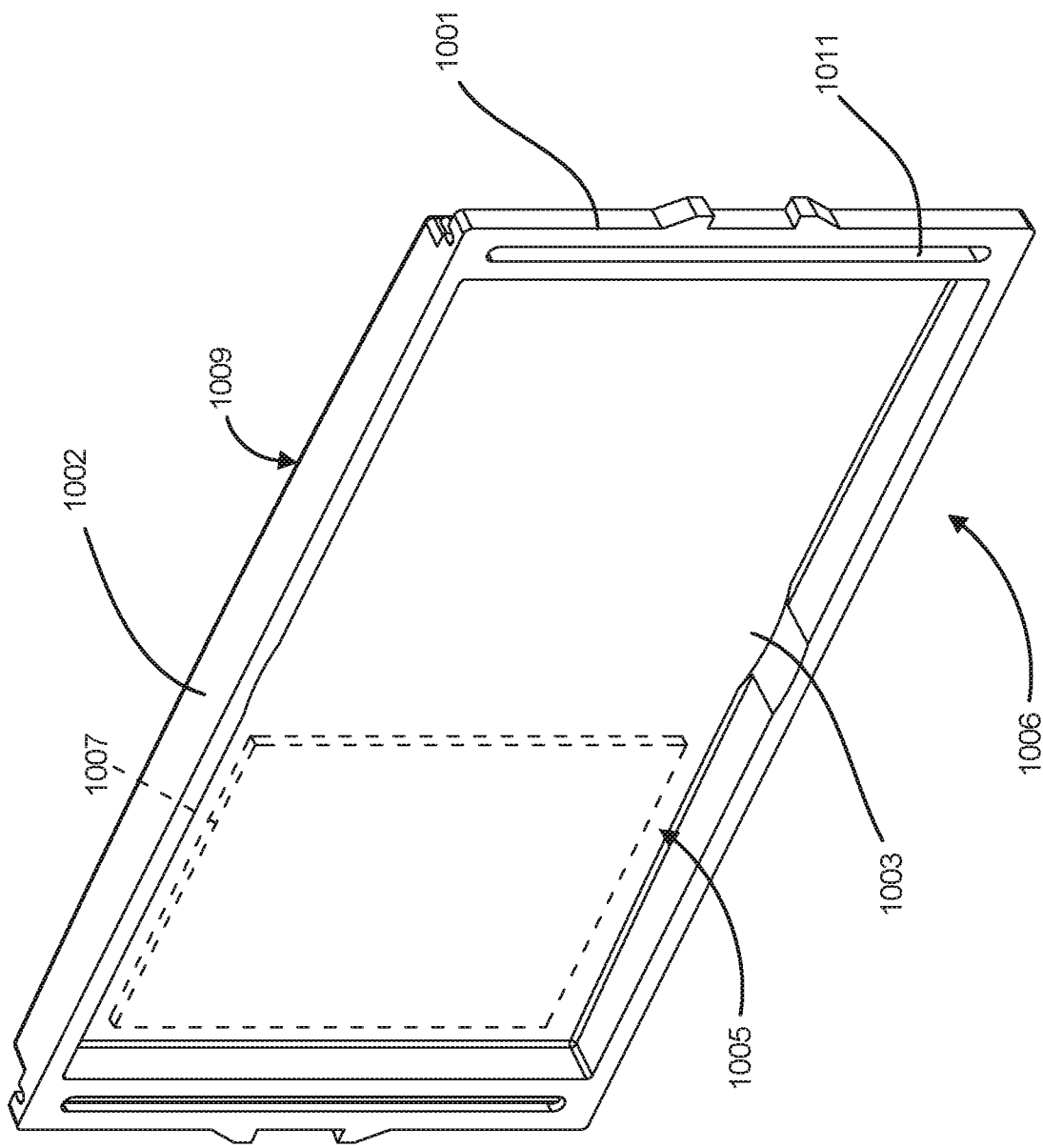
FIG. 32 illustrates a perspective view of another example of an indicia badge that can be received by the holder shown in FIG. 23.

Another example of an indicia badge 1006 that can be received by a holder, such as holder 804, is shown in FIG. 32. The indicia badge 1006 can include a recess 1003 disposed in a rear side 1005 to receive an RFID tag 1007 (schematically shown in FIG. 32). The RFID tag 1007 can be secured within the recess 1003 via adhesive (or other like fastener), or, alternatively, loosely positioned therein. Once inserted into the holder 804, the rear side 1005 of the indicia badge 1006 will be obscured. Embedding the RFID tag 1007 within the rear side 1005 of the indicia badge 1006 provides a target for the user to easily scan when seeking the RFID tag information. Further, embedding the RFID tag 1007 within the rear side 1005 of the indicia badge 1006 also allows for a clean front face 1009 that further enables the user to place additional indicia (such as a label) thereon. In some examples, the indicia badge 1006 can have a clean front face 1009 without any additional indicia. In some examples, the indicia badge 1006 can have a clean front face 1009 that is configured to receive information printed thereon (e.g., using a tamp-on printing technique). In further examples, the indicia badge 1006 can be a variety of different colors.

Figure 33:
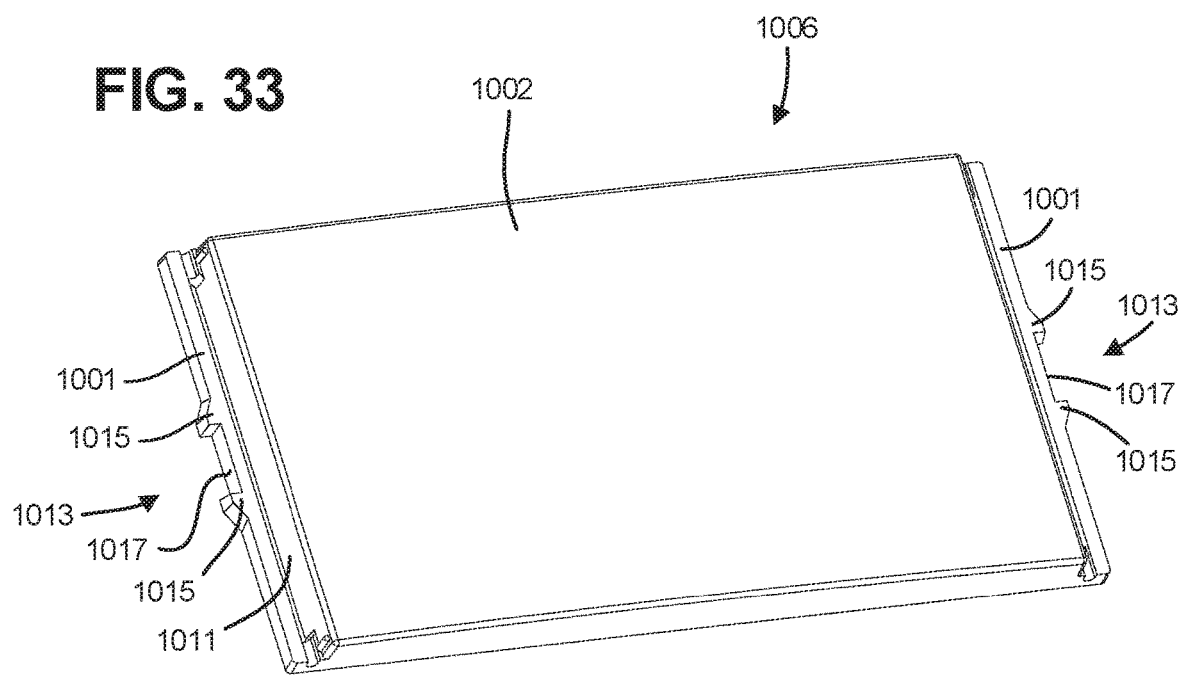
FIG. 33 illustrates a perspective front view of the indicia badge of FIG. 32.
Figure 34:
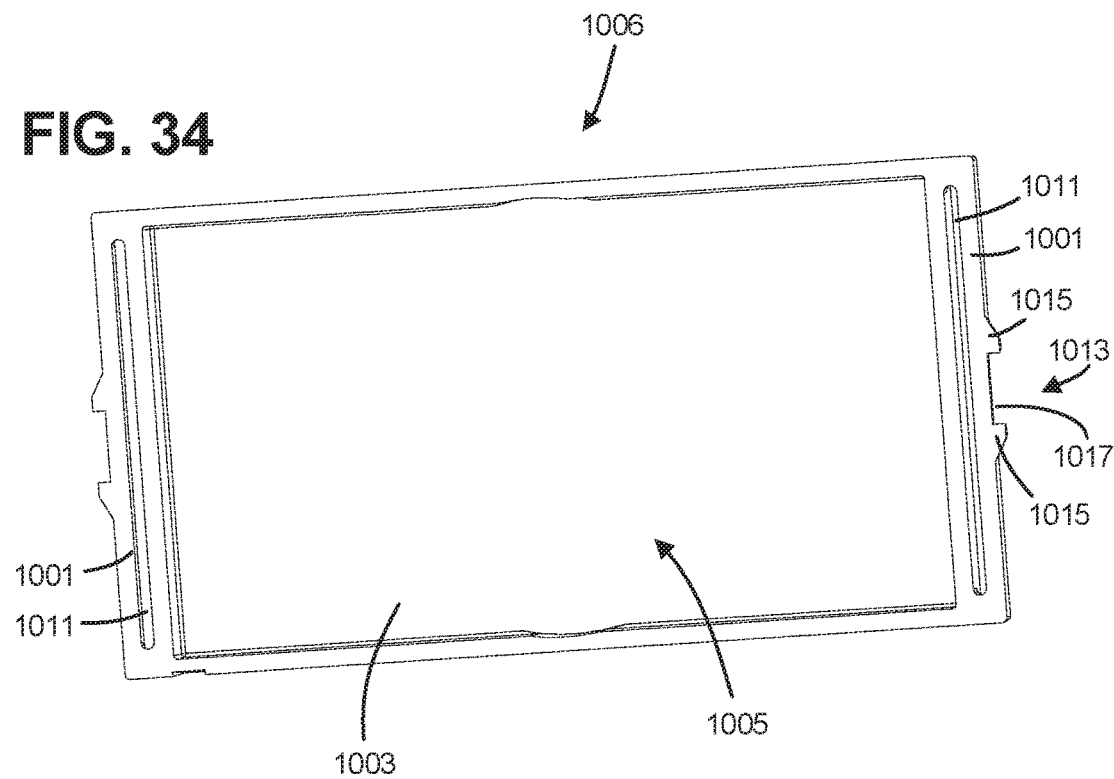
FIG. 34 illustrates a perspective rear view of the indicia badge of FIG. 32.

FIGS. 33-34 show perspective front and rear views of the indicia badge 1006, respectively. The indicia badge 1006 includes a pair of engaging arms 1001 at opposite sides of the indicia badge 1006. Each arm 1001 is extends away from a main body 1002 of the indicia holder 1006. In some examples, each arm 1001 is separated from the main body 1002 by way of at least one recess 1011. In some examples, each arm 1001 is separated from the main body 1002 by way of more than one recess 1011. In some examples, each arm 1001 is flexible. In some examples, each arm 1001 is configured to be irreparably damaged if indicia badge 1006 is tampered with.

Each arm 1001 also includes at least one holder engaging feature 1013 that is configured to interface with a holder, such as holder 804, to retain the indicia badge 1006 within the holder. In some examples, the holder engaging feature 1013 includes a pair of ramped surfaces 1015 and a rectangular channel 1017 positioned there between. In some examples, the holder engaging feature 1013 includes only a single ramped surface 1015. In some examples, the indicia badge 802 enters the holder 804 from an edge of the telecommunications component. In other examples, the holder 804 includes a raised portion so that the indicia badge can be inserted into the holder 804 from the raised portion.

Figure 35:
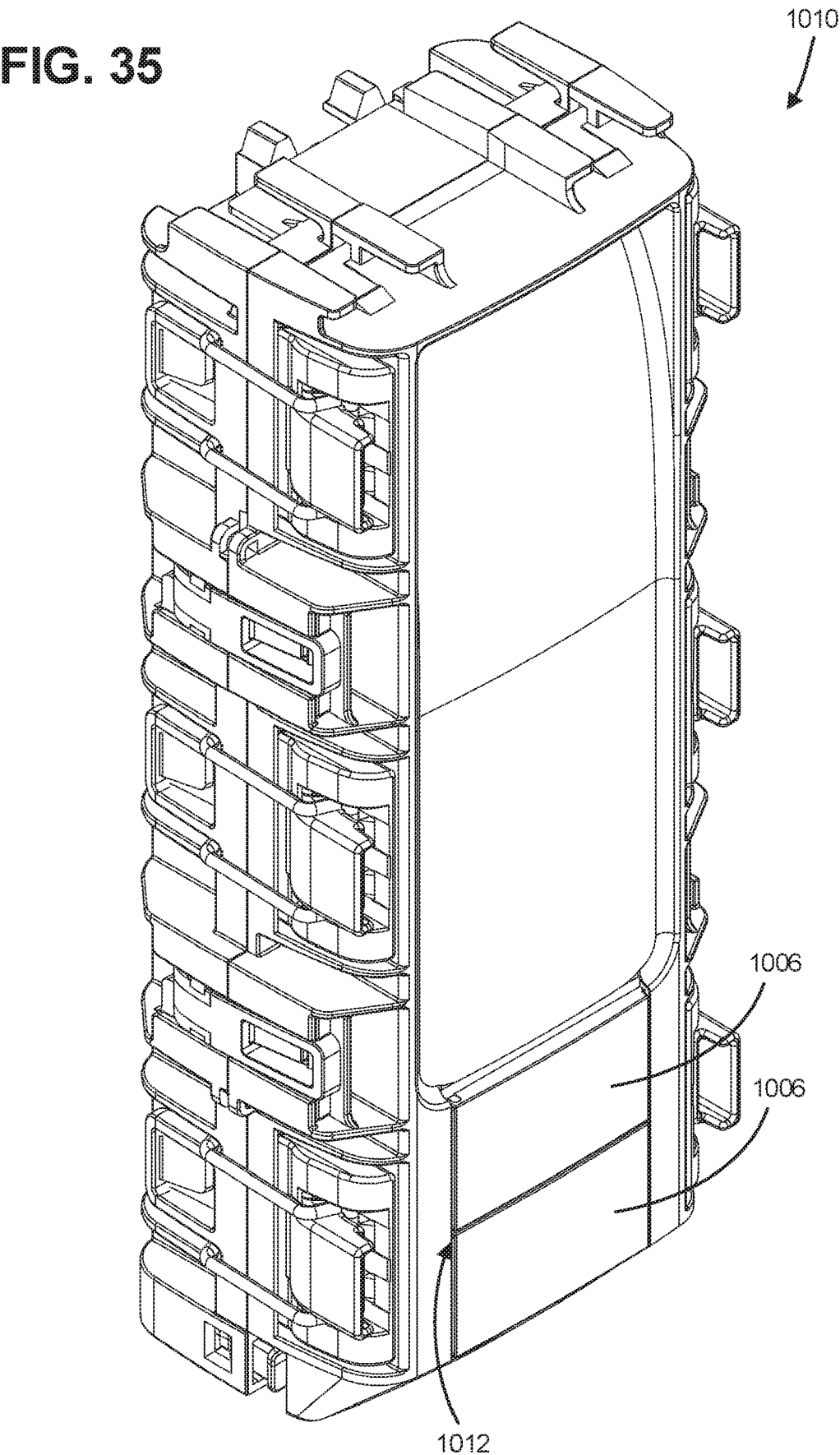
FIG. 35 illustrates a perspective view of an example enclosure including the indicia badge of FIG. 32.
Figure 36:
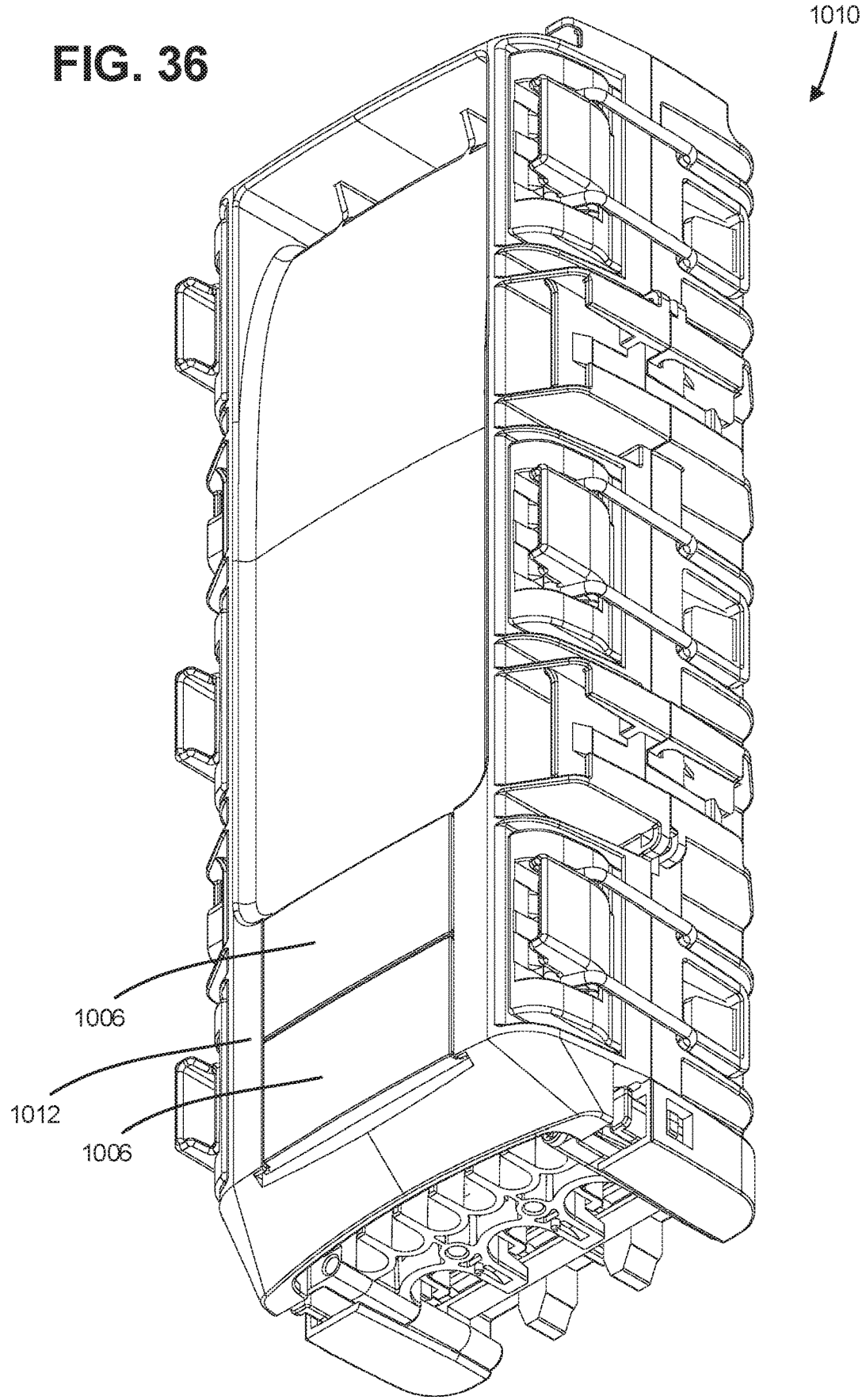
FIG. 36 illustrates another perspective view of an example enclosure including the indicia badge of FIG. 32.
Figure 37:
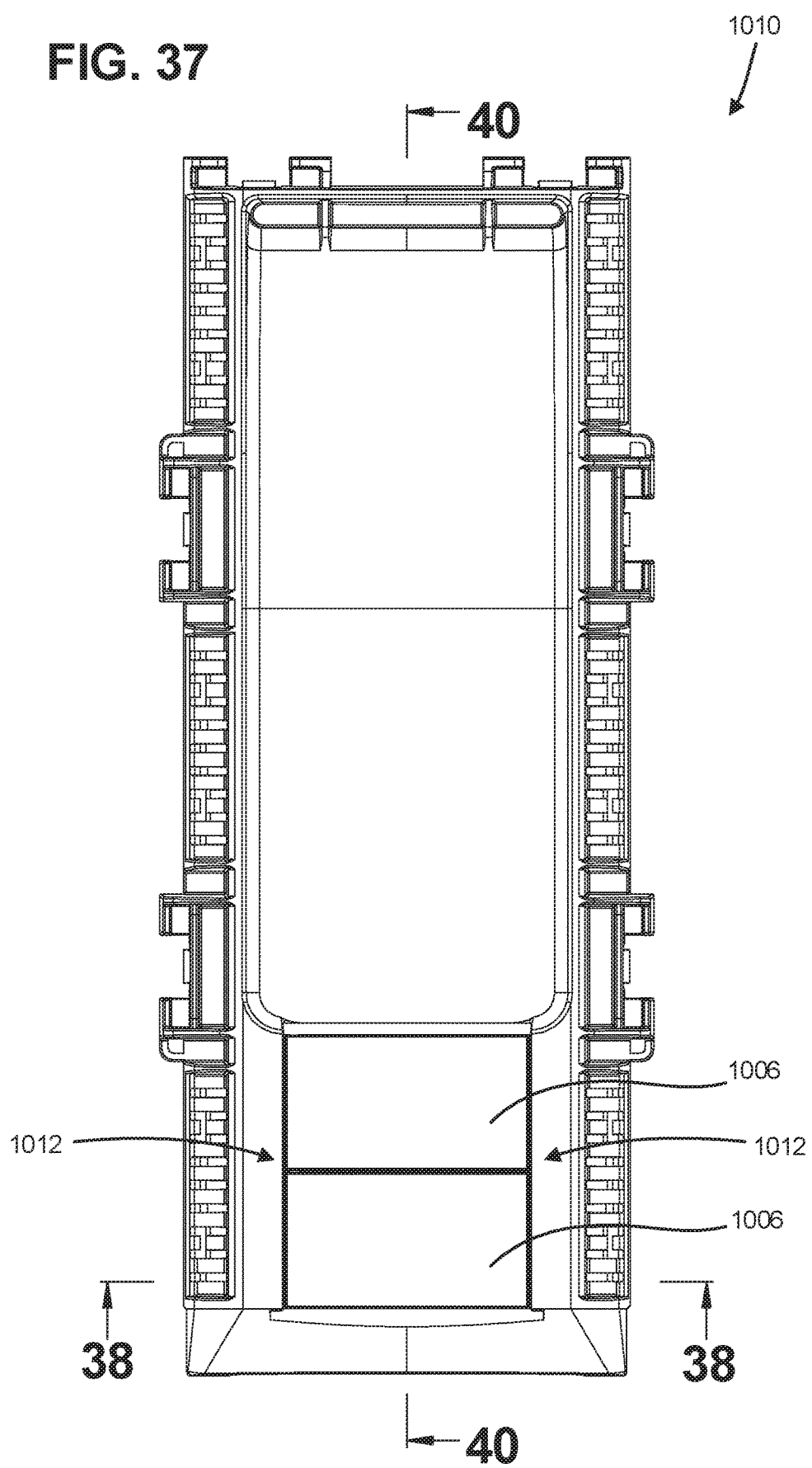
FIG. 37 illustrates another perspective view of an example enclosure including the indicia badge of FIG. 32.

FIGS. 35-37 show a pair of indicia badges 1006 positioned on an enclosure 1010. In some examples, the enclosure 1010 and indicia badges 1006 can include features that are ornamental in nature. In some examples, only a single indicia badge 1006 is positioned on the enclosure 1010. In some examples, greater than two indicia badges 1006 are positioned on the enclosure 1010. In some examples, the indicia badges 1006 are positioned adjacent one another or spaced away from each other on the enclosure 1010. As shown, the indicia badge 1006 is relatively small with respect to the overall size of the enclosure 1010. In some examples, the indicia badge 1006 less than half as tall of the overall length of the enclosure 1010. In some examples, the indicia badge 1006 is less than a third as tall of the overall length of the enclosure 1010. In some examples, the indicia badge 1006 is less than a quarter as tall of the overall length of the enclosure 1010.

As shown, the enclosure 1010 includes a holder 1012 to secure the indicia badges 1006 on the enclosure 1010. The holder 1012 can be integral with the housing of the enclosure 1010. The indicia badges 1006 are configured to be irreparably damaged if someone attempts to remove the indicia badges 1006 from the holder 1012.

Figure 38:
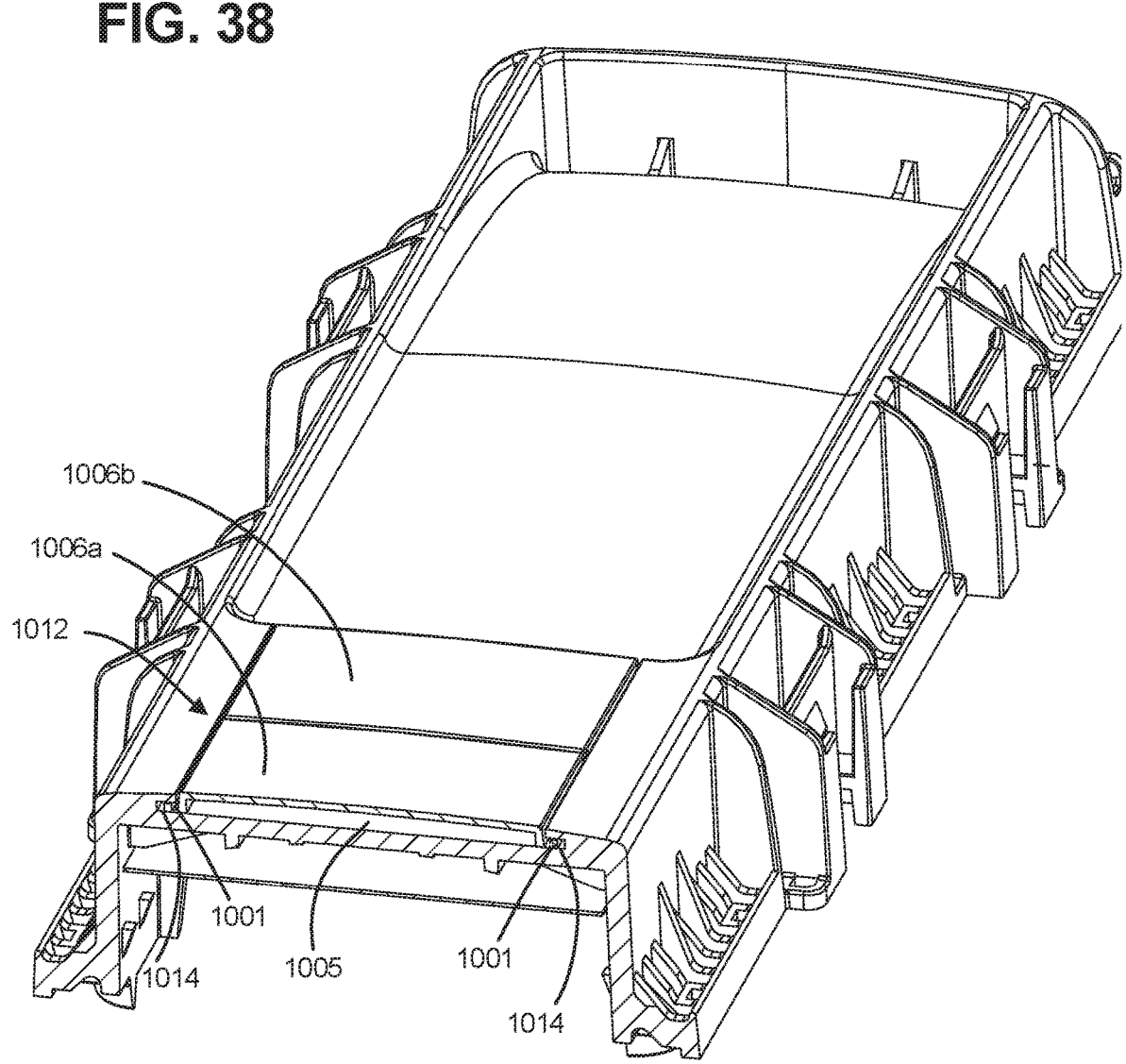
FIG. 38 illustrates a perspective cross-sectional view along line 38-38 in FIG. 37.

FIG. 38 shows a perspective cross-sectional view along line 38-38 of FIG. 37 to show the indicia badges 1006 in the holder 1012. As shown, the arms 1001 of each indicia badge 1006 are positioned and retained within a badge receiving channel 1014 of the holder 1012. FIG. 39 shows another perspective cross-sectional view along line 38-38 of FIG. 37 to show the indicia badges 1006 in the holder 1012. As shown, the RFID tag 1007 is positioned at the rear side 1005 of the badge 1006, between the rear side 1005 and the enclosure 1010. Such placement of the RFID tag 1007 allows a user to scan each indicia badge 1006 with an RFID reader when the badges are installed on the enclosure 1010 so that the user can to gain additional information from the RFID tag 1007, such as enclosure identifying information. As noted above, because the RFID tag is at the rear side 1005 of the each indicia badge 1006 and each badge 1006 is retained by the holder 1012, the RFID tag is protected.

FIG. 40 shows a perspective cross-sectional view along line 40-40 of FIG. 37 to show the indicia badges 1006*a*, 1006*b* positioned adjacent one another in the holder 1012. In some examples, neither badge 1006*a*, 1006*b* includes an RFID tag 1007. In some examples, at least one badge 1006*a*/1006*b* includes an RFID tag 1007. In some examples, both badges 1006*a*/1006*b* include an RFID tag 1007.

Figure 41:
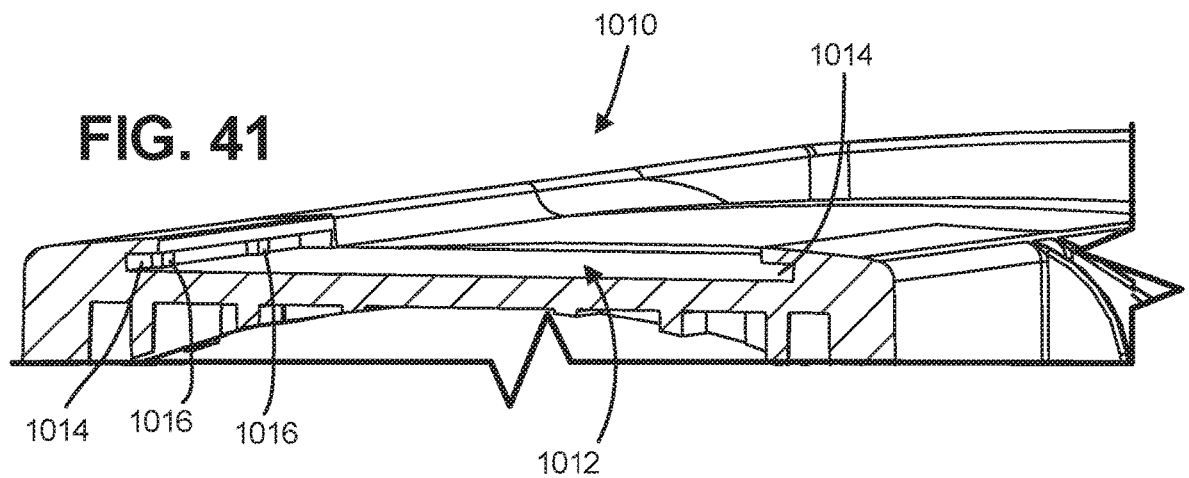
FIG. 41 illustrates a perspective cross-sectional view along line 38-38 in FIG. 37 without indicia badges.
Figure 42:
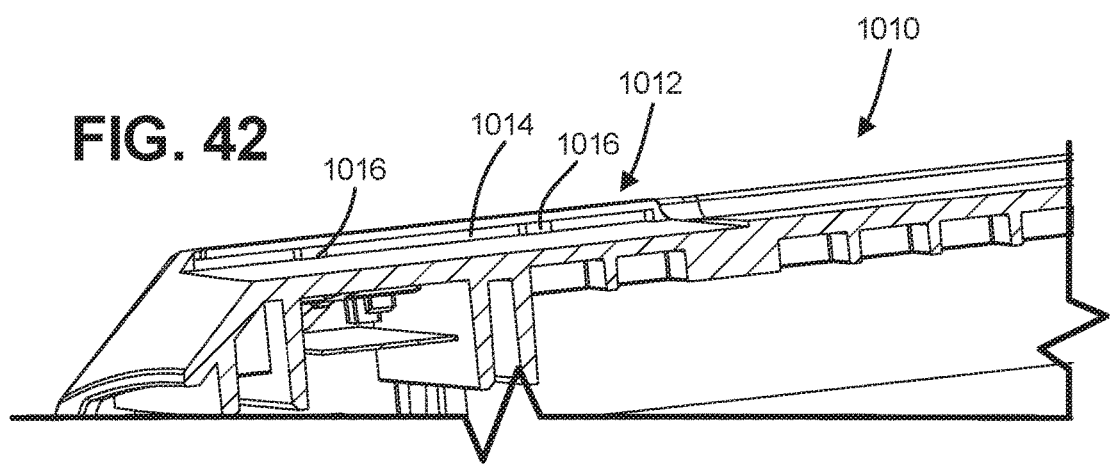
FIG. 42 illustrates a perspective cross-sectional view along line 40-40 in FIG. 37 without indicia badges.

FIGS. 41 and 42 show perspective cross-sectional views of the holder 1012 along line 38-38 and line 40-40 of FIG. 37 without indicia badges 1006 positioned therein. The holder 1012 includes at least one badge engaging feature 1016 positioned within each the badge receiving channel 1014. The badge engaging feature 1016 is configured to mate with the holder engaging feature 1013 of an indicia badge 1006 so as to retain the indicia badge 1006 within the holder 1012. In some examples, the holder 1012 can include a badge engaging feature 1016 to mate within each holder engaging feature 1013 of each indicia badge 1006. In some examples, the holder 1012 can include a number of badge engaging features 1016 to mate within only a select number of holder engaging features 1013 of each indicia badge 1006.

Figure 43:
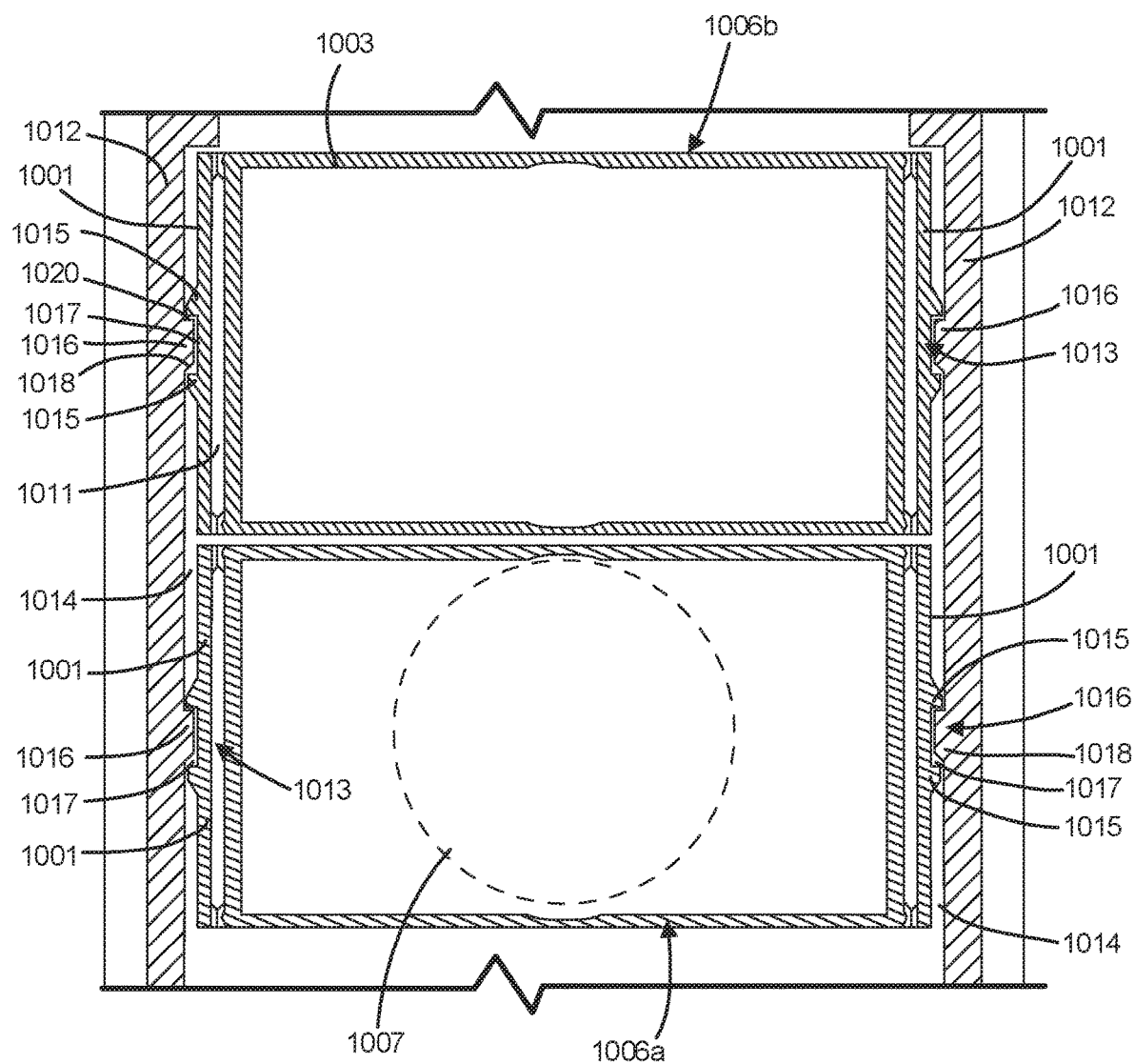
FIG. 43 illustrates a schematic view of a holder interacting with a pair of indicia badges, according to one example of the present disclosure.

FIG. 43 depicts a schematic cross-sectional view of the indicia badges 1006 positioned within the holder 1012. In the depicted example, each badge engaging feature 1016 of the holder 1012 is a projection within each badge receiving channel 1014. The projection includes a ramped side 1018 and a non-ramped side 1020. As indicia badges 1006 are inserted into the badge receiving channel 1014, the ramped surface 1015 of the holder engaging feature 1013 of the arm 1001 of an indicia badge 1006 interfaces with, and rides over, the ramped side 1018 of the each badge engaging feature 1016 of the holder 1012. During such interaction, each arm 1001 flexes inwardly, facilitated in part by the recess 1011, until the badge engaging feature 1016 is positioned within the rectangular channel 1017 of the holder engaging feature 1013. Once positioned therein, because the channel 1017 is rectangular and because the badge engaging feature 1016 includes a non-ramped side, the badge 1006 is retained within the holder 1012. In some examples, in the position shown in FIG. 43, the indicia badges 1006*a*/1006*b* cannot be removed from the holder 1012 unless at least one arm 1001 of each badge 1006 is irreparably damaged, thereby preventing the badge 1006 from being retained within the holder 1012, rendering the badge 1006 unusable. In some examples, the badge engaging feature 1016 can include a recess, similar to channel 1017, that receives a projection of the holder engaging feature 1013 of the badge 1006. It is considered within the scope of the present disclosure that the badge engaging feature 1016 and holder engaging feature 1013 can have a variety of different configurations where, upon tampering with one of the holder 1012 and indicia badge 1006, the indicia badge 1006 becomes irreparably damaged.

Figure 24:
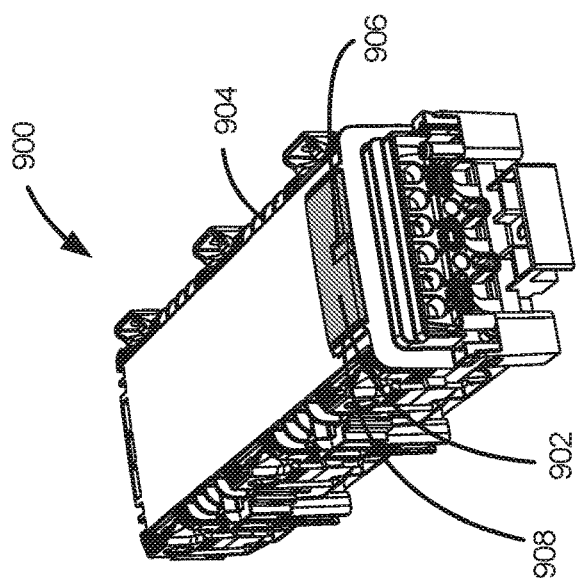
FIG. 24 illustrates a perspective view of another example of an indicia element secured to a telecommunications component.
Figure 25:
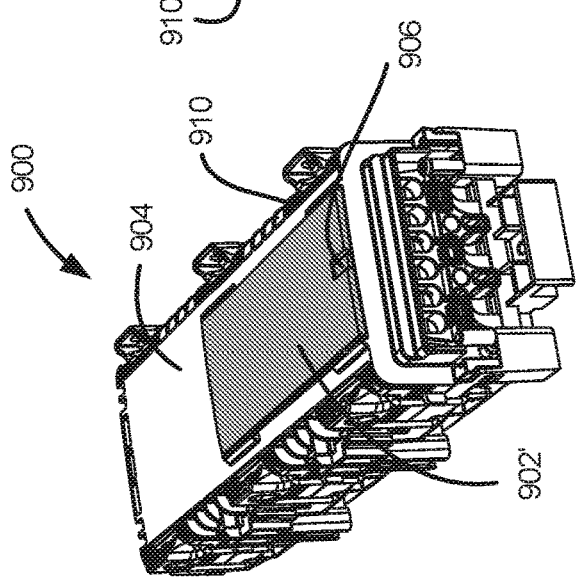
FIG. 25 illustrates a perspective view of another example of an indicia element secured to the telecommunications component of FIG. 24.
Figure 26:
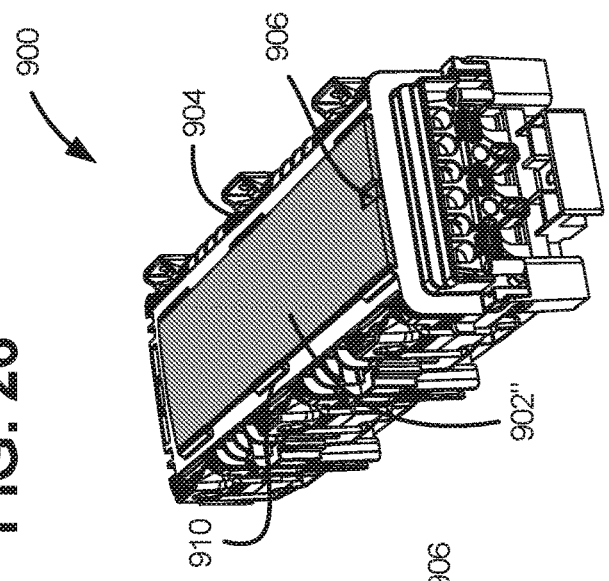
FIG. 26 illustrates a perspective view of another example of an indicia element secured to the telecommunications component of FIG. 24.

FIG. 24 shows another example of a telecommunications component 900 with an indicia element 902. FIG. 25 shows another example of a telecommunications component 900 with an indicia element 902'. FIG. 26 shows another example of a telecommunications component 900 with an indicia element 902". As shown, the telecommunications component 900 is an enclosure that has an outer housing 904. In the depicted example, the indicia elements 902, 902', 902" are tags attached to the outer housing 904. In some examples, the indicia elements 902, 902', 902" must be irreparably damaged in order to remove the indicia elements 902, 902', 902" from the telecommunications component 900.

In some examples, the indicia elements 902, 902', 902" can have a variety of different sizes and shapes. For example, the indicia elements 902, 902' can cover a portion of a surface of the outer housing 904. In other examples, the indicia element 902" can cover the majority of a surface of the outer housing 904. In some examples, the indicia elements 902, 902', 902" have a rigid construction. In other examples, the indicia elements have a flexible construction (such as a label).

Figure 27:
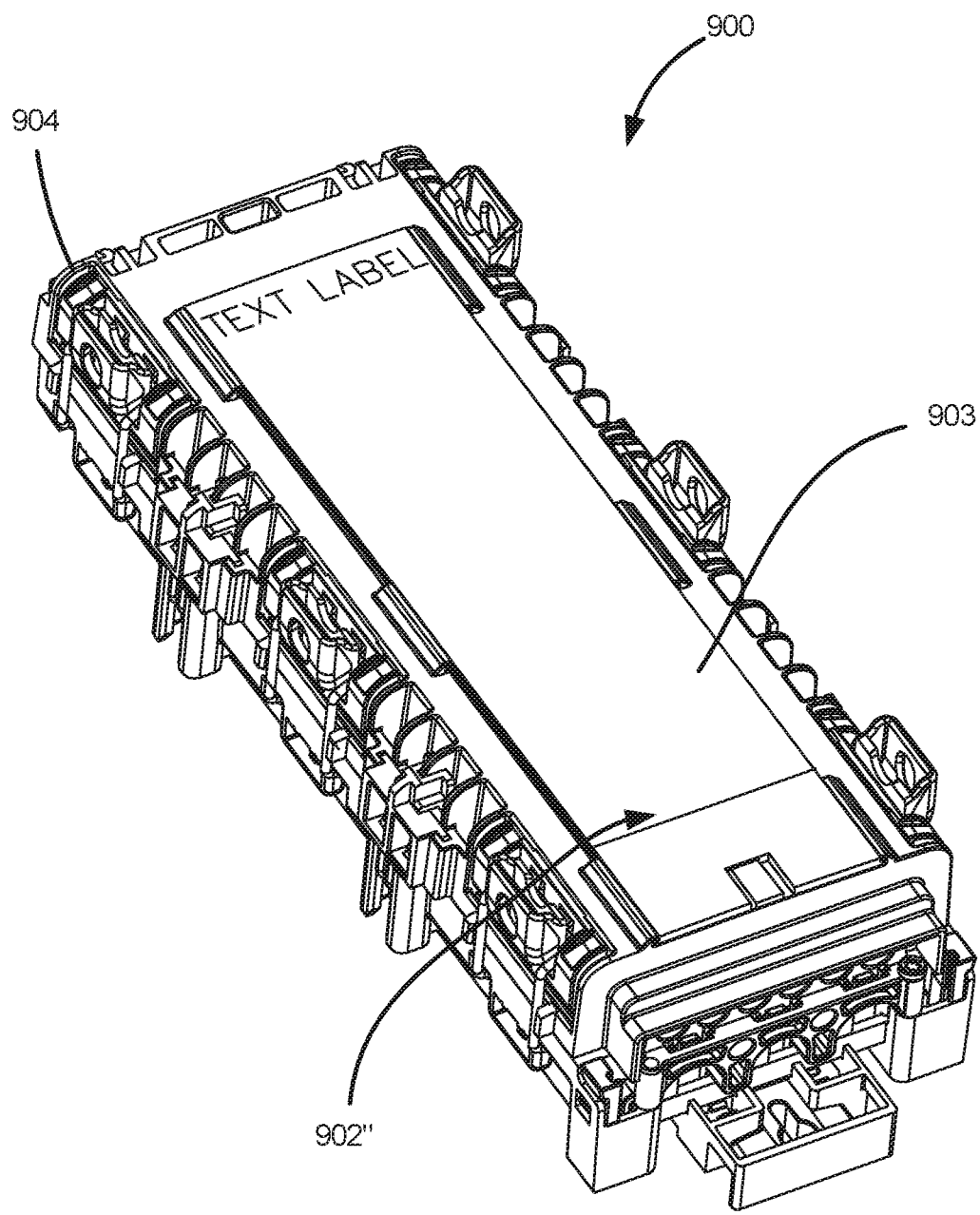
FIG. 27 illustrates a perspective view of information disposed on the indicia element of FIGS. 24-26.

The indicia elements 902, 902', 902" can include a logo, a specific color, text information (i.e. numbers, letter, characters, etc.), a barcode, a QR code, and a RFID tag or other identifying characteristic. For example, FIG. 27 shows the indicia element 902" with a variety of printed information 903 disposed thereon. In some examples, the information 903 can be adhered to the indicia elements 902, 902', 902" (e.g. a label, printed sticker, etc.). In other examples, the information 903 can be formed in the indicia elements 902, 902', 902".

The indicia elements 902, 902', 902" include a securing feature 906 that is configured to secure the indicia elements 902, 902', 902" to the telecommunications component 900. In some examples, the securing feature 906 is a tab. In some examples, the securing feature 906 is a spring-loaded tab. In some examples, the securing feature 906 becomes irreparably damaged if the indicia elements 902, 902', 902" are removed from the telecommunications component 900.

Figure 28:
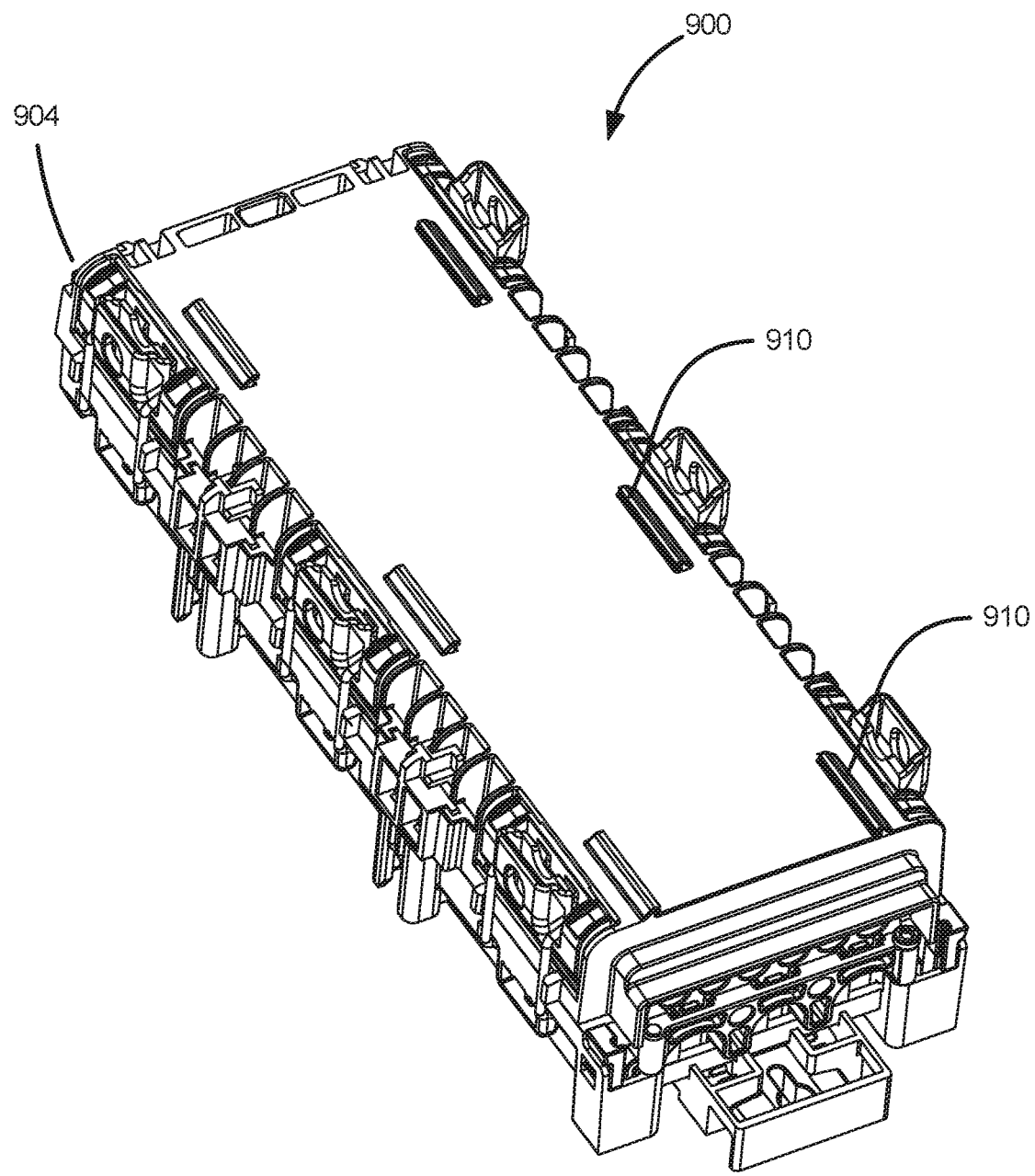
FIG. 28 illustrates a perspective view of the telecommunications component of FIG. 24 without an indicia component secured thereto.

The indicia elements 902, 902', 902" include mating features 908 that are configured to mate with corresponding housing mating features 910 in order to aid in securing the indicia elements 902, 902', 902" to the outer housing 904. FIG. 28 shows the telecommunications component 900 without an indicia element 902 secured thereto. In the depicted example, the housing mating features 910 are channels that receive the corresponding mating features 908 of the indicia elements 902, 902', 902".

Figure 29:
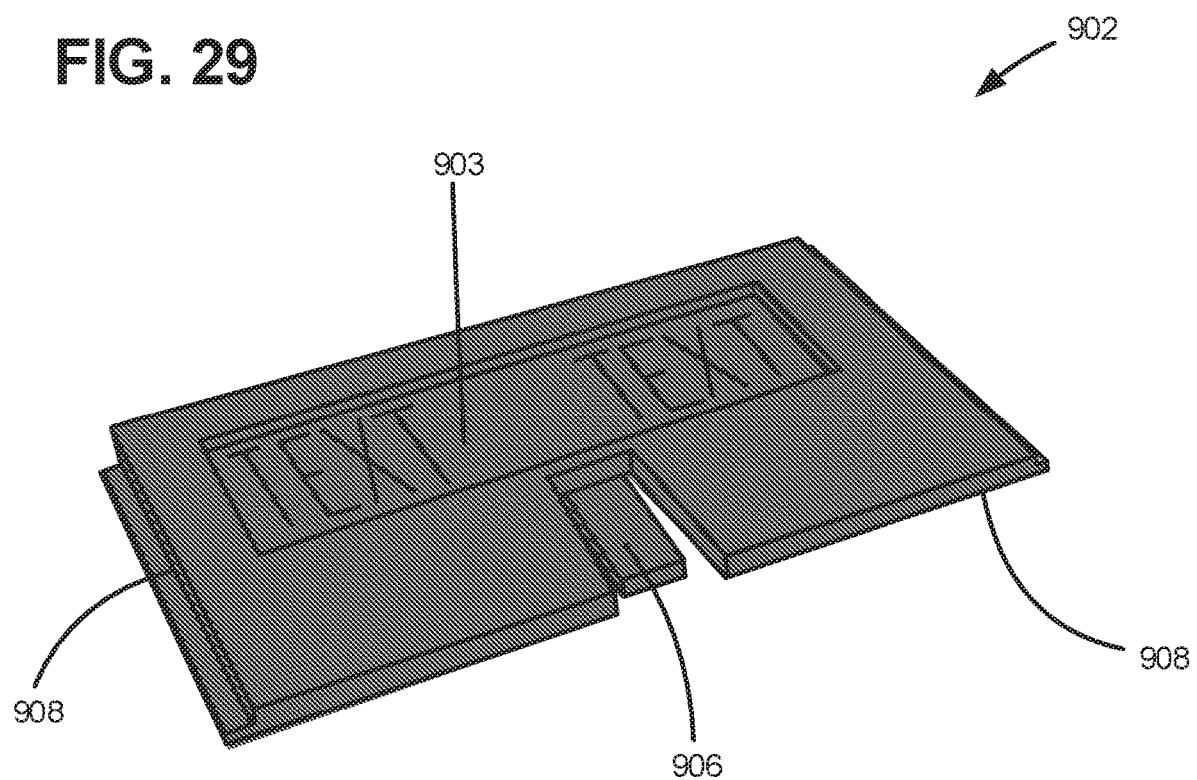
FIG. 29 illustrates a perspective view of the indicia element of FIGS. 24-26.

FIG. 29 shows a perspective view of the indicia element 902. As shown, the indicia element 902 includes mating features 908 that are configured to be positioned within the housing mating features 910. The indicia element 902 also depicts the securing feature 906 as a tab. The information 903 is shown to be formed within the indicia element 902. In some examples, the indicia element 902 can be constructed of a plastic, metal, or like material.

Figure 30:
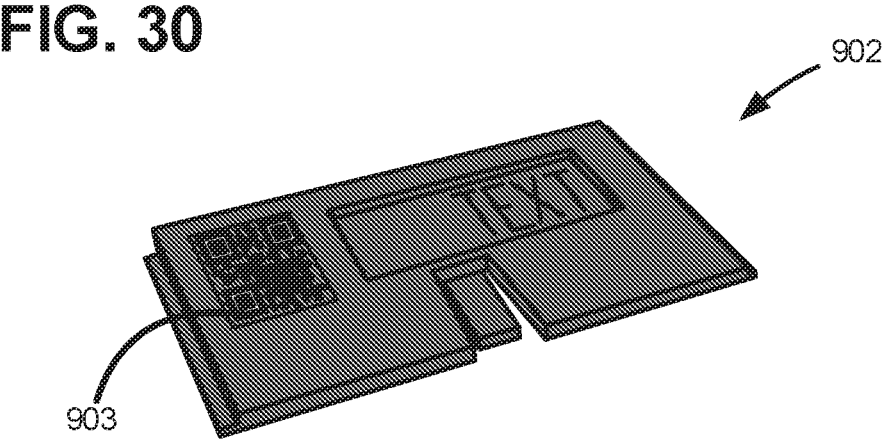
FIG. 30 illustrates a perspective view of the indicia element of FIGS. 24-26 including a QR code.
Figure 31:
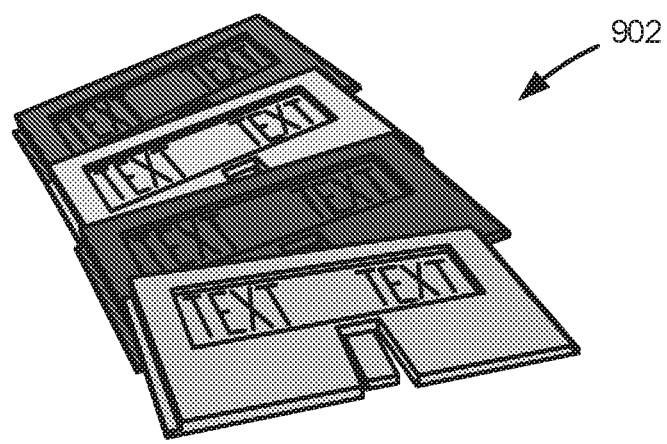
FIG. 31 illustrates a perspective view of a plurality of the indicia elements of FIGS. 24-26 in a variety of different colors.

FIG. 30 depicts information 903 in the form of a QR code. FIG. 31 depicts a plurality of indicia elements 902 each having a variety of different colors.

Figure 44:
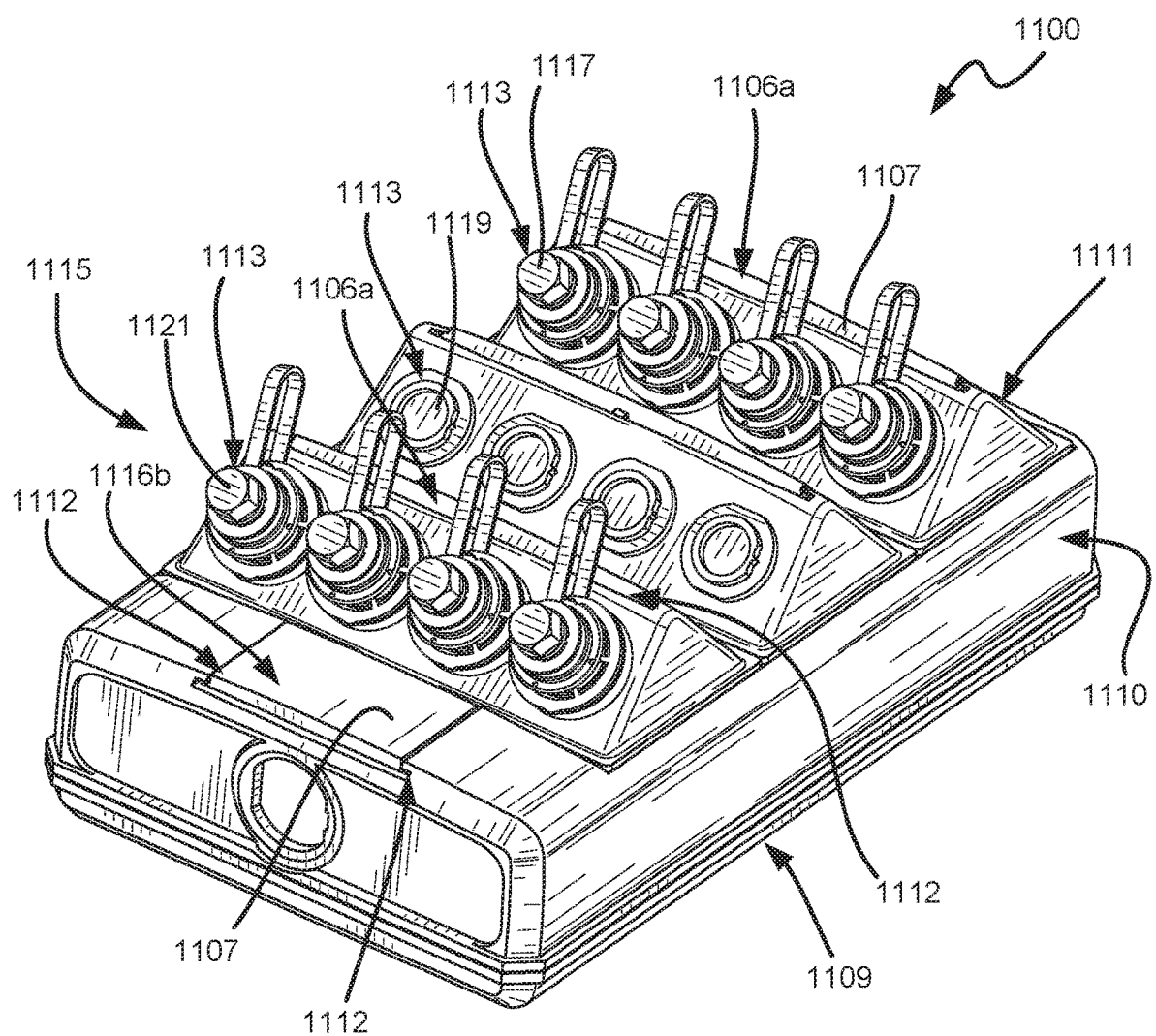
FIG. 44 illustrates a perspective view of an example enclosure including an example indicia badge.
Figure 45:
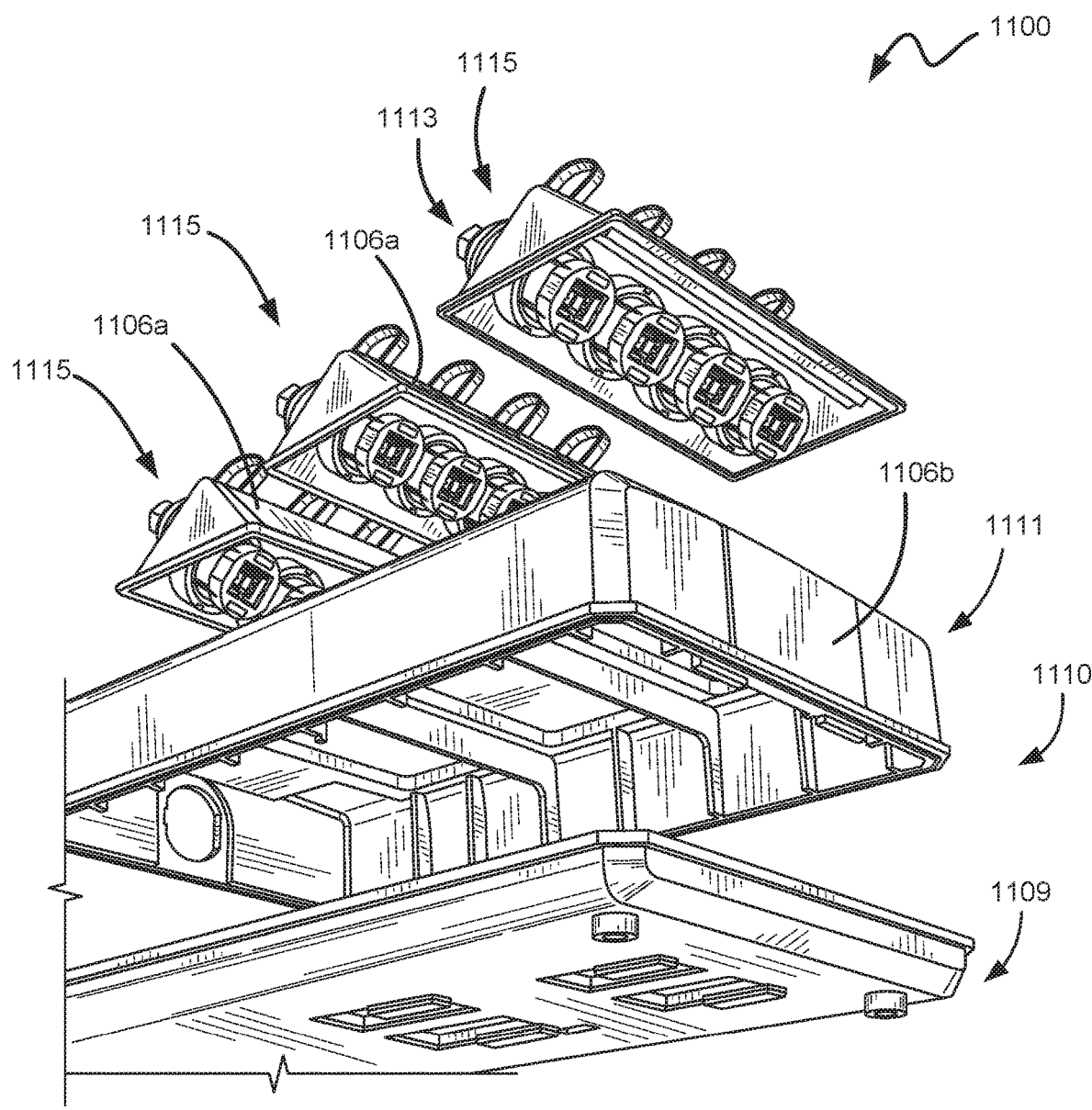
FIG. 45 illustrates a partial exploded view of the enclosure of FIG. 44.

FIG. 44 shows indicia badges 1106 positioned on an enclosure 1100. FIG. 45 shows the enclosure 1100 partially exploded. The enclosure 1100 includes an outer housing 1110 that includes a base 1109 and a cover 1111. In some examples, the cover 1111 includes a plurality of ports 1113 that each can provide access to inside the enclosure 1110. In some examples, the indicia badges 1106 are positioned on the cover 1111, adjacent the ports 1113. In some examples, the enclosure 1100 and indicia badges 1106 can include features that are ornamental in nature. In some examples, only a single indicia badge 1106 is positioned on the enclosure 1100. In some examples, more than two indicia badges 1106 are positioned on the enclosure 1100. In some examples, the indicia badges 1106 are positioned adjacent one another or spaced away from each other on the enclosure 1110.

As shown, the enclosure 1100 includes a plurality of badge holders 1112 to secure the indicia badges 1106 on the enclosure 1100. The badge holders 1112 and indicia badges 1106 are substantially similar to those described above. The holder 1112 can be integral with the outer housing 1110, specifically the cover 1111, of the enclosure 1010.

In the depicted example, the ports 1113 are arranged in angled rows 1115 on the cover 1111. The cover 1111 can include a plurality of angled rows 1115 each including a plurality of ports 1113. In some examples, each row 1115 includes more than one port 1113. In the depicted example, the cover 1111 includes three rows 1115. As shown in FIG. 45, each row 1115 can be separable from the cover 1111.

Each port 1113 can be filled with a plug 1117 and/or include a cover 1119. In some examples, the plug 1117 can include a plug dust cover 1121 that can be removed so that a connection can be made with the plug 1117. In some examples, the plug 1117 includes an adapter that is configured to mate with a connector.

Immediately adjacent the ports 1113, indicia badges 1106 are disposed. The indicia badges 1106 can include indicia 1107 that is at least one of a logo, a specific color, text information, a barcode, a QR code, and a RFID tag that can be used to identify the identity of the enclosure 1100 and/or the identity of a particular port 1113 or groups of ports in the row 1115. For example, the indicia badge 1106 can include text that indicates if a port 1113 is a split connection or a port in a point-to-point connection. In some examples, the indicia badges 1106 immediately adjacent the ports 1113 are first indicia badges 1106a and other indicia badges 1106b positioned elsewhere on the cover 1111 are second indicia badges 1106b. In some examples, the first indicia badges 1106a immediately adjacent the ports 1113 are sized larger than the second indicia badges 1106b positioned elsewhere on the cover 1111. In some examples, the first indicia badges 1106a immediately adjacent the ports 1113 include additional securing features compared to the second indicia badges 1106b. In other examples, the indicia badges 1106 can include a pair of RFID tags at the rear side.

Figure 46:
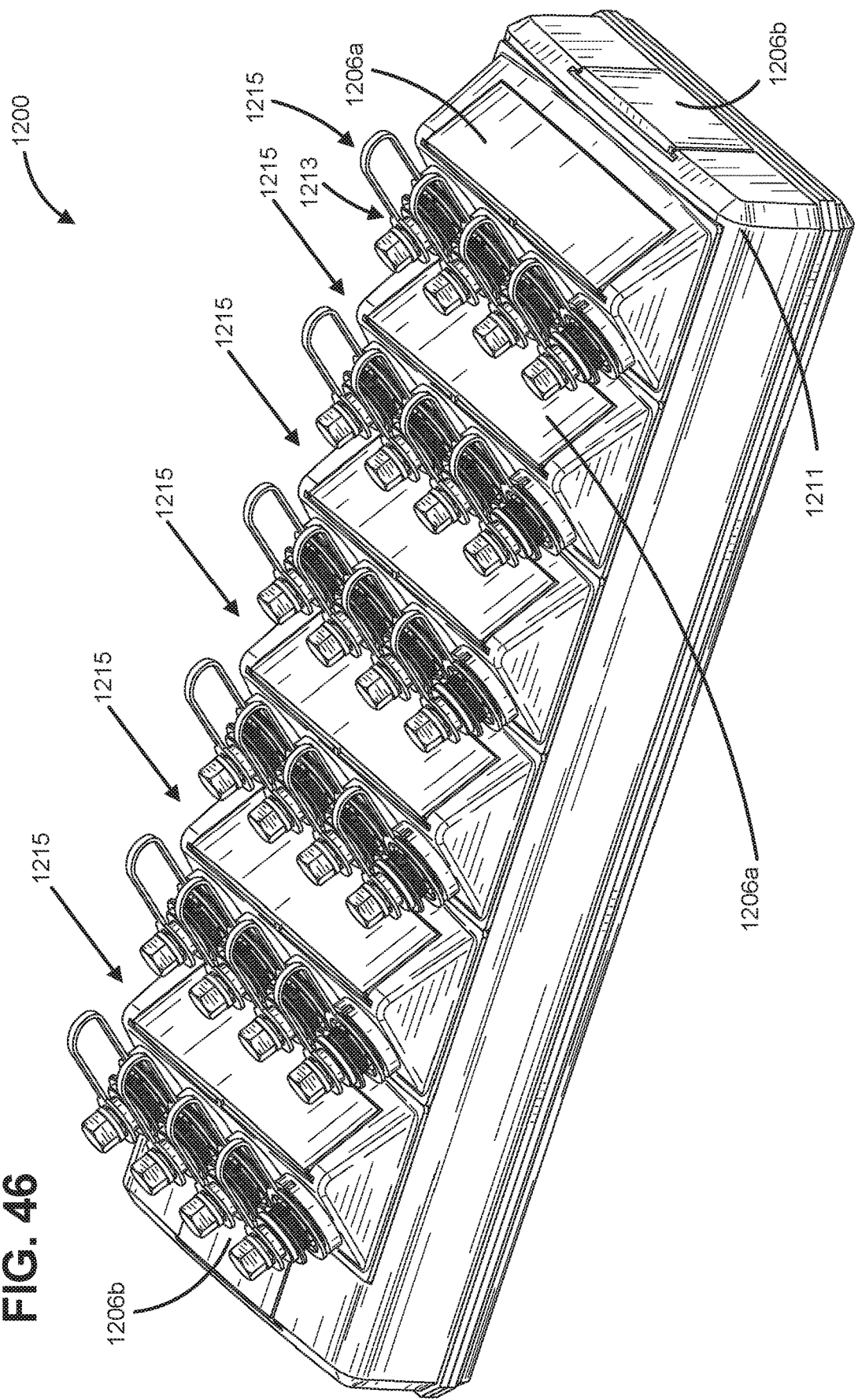
FIG. 46 illustrates a perspective view of an example enclosure including an example indicia badge.

FIG. 46 shows another enclosure 1200, according to one example of the present disclosure. As shown, the enclosure 1200 is substantially similar to the enclosure 1100 described above. The enclosure 1200 includes additional rows 1215 of ports 1213 installed on a cover 1211. Further, the enclosure 1200 includes first indicia badges 1206a that correspond to the rows 1215 and second indicia badges 1206b that are positioned elsewhere on the enclosure 1200. The first and second indicia badges 1206a, 1206b are substantially similar to the first and second indicia badges 1106a, 1106b, described above.

Figure 47:
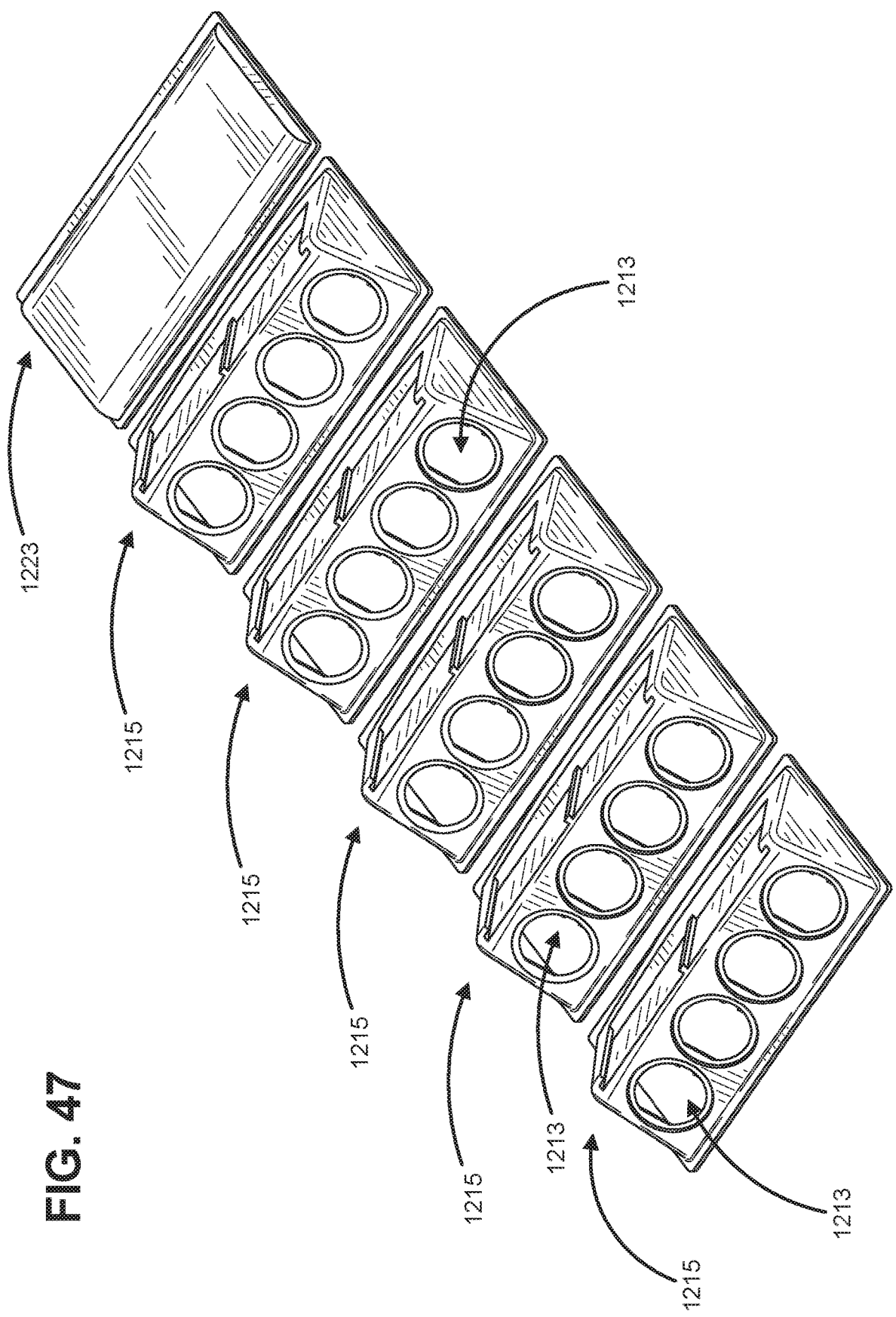
FIG. 47 illustrates a partial exploded view of the enclosure of FIG. 46.

FIG. 47 shows rows 1215 separated from the enclosure 1200. As shown, each row 1215 includes ports 1213 that are configured to receive plugs 1217, and covers 1221, or the like. In some examples, the ports 1213 are differently sized within the same row 1215. In other examples, the ports 1213 are sized differently amongst rows 1215. As shown, a blank 1223 can also be installed on the cover 1211 in lieu of a row 1215.

As shown, each row 1215 includes a holder 1212 configured to receive at least one indicia badge 1206. In some examples, the holder 1212 is configured to receive more than one indicia badge 1206. In some examples, the holder 1212 is substantially similar to the holders described above. The holder 1212 facilitates the positioning of the indicia badge 1206 immediately adjacent the ports 1213 and/or on the cover 1211.

Figure 48:
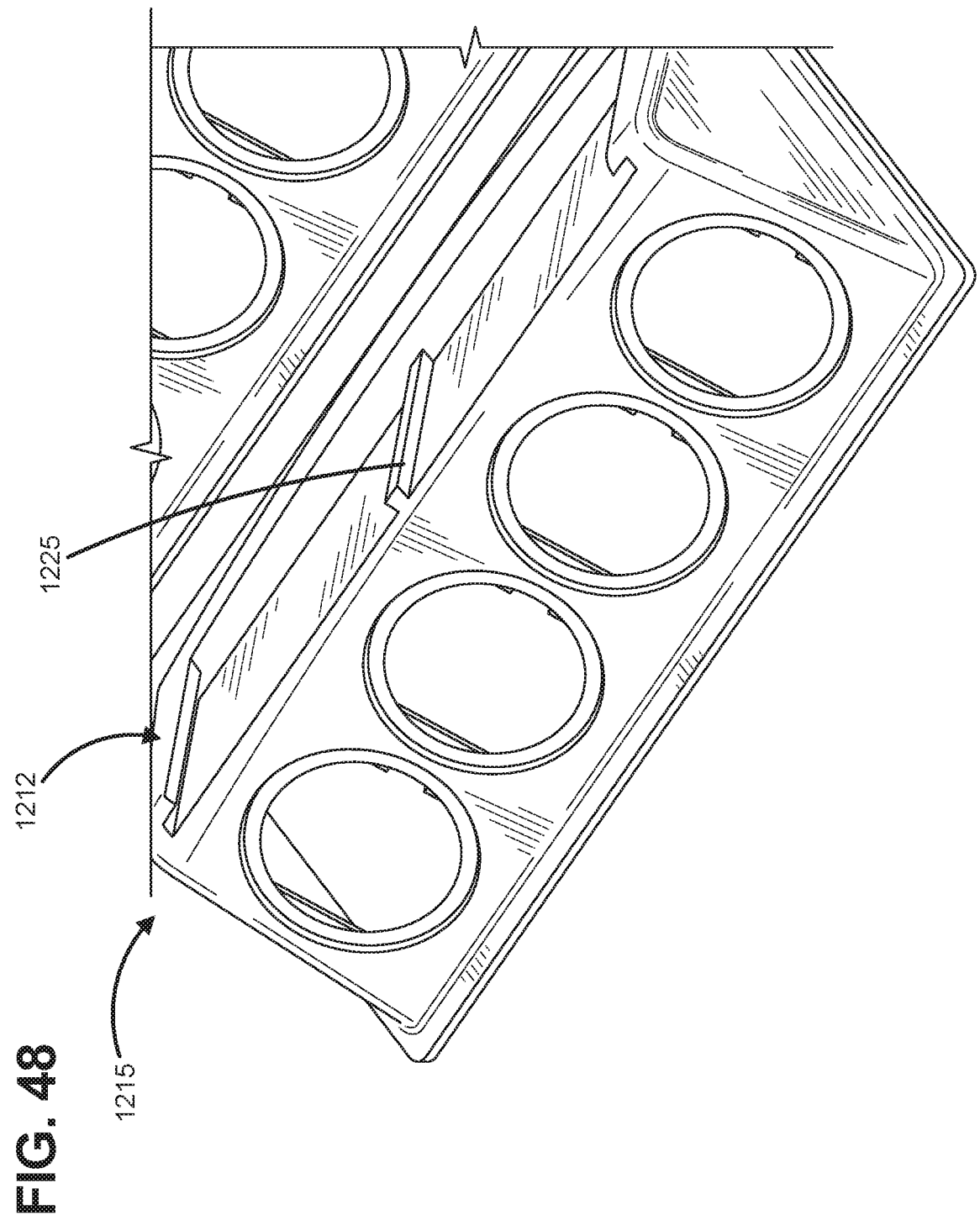
FIG. 48 illustrates a zoomed-in view of FIG. 47.
Figure 49:
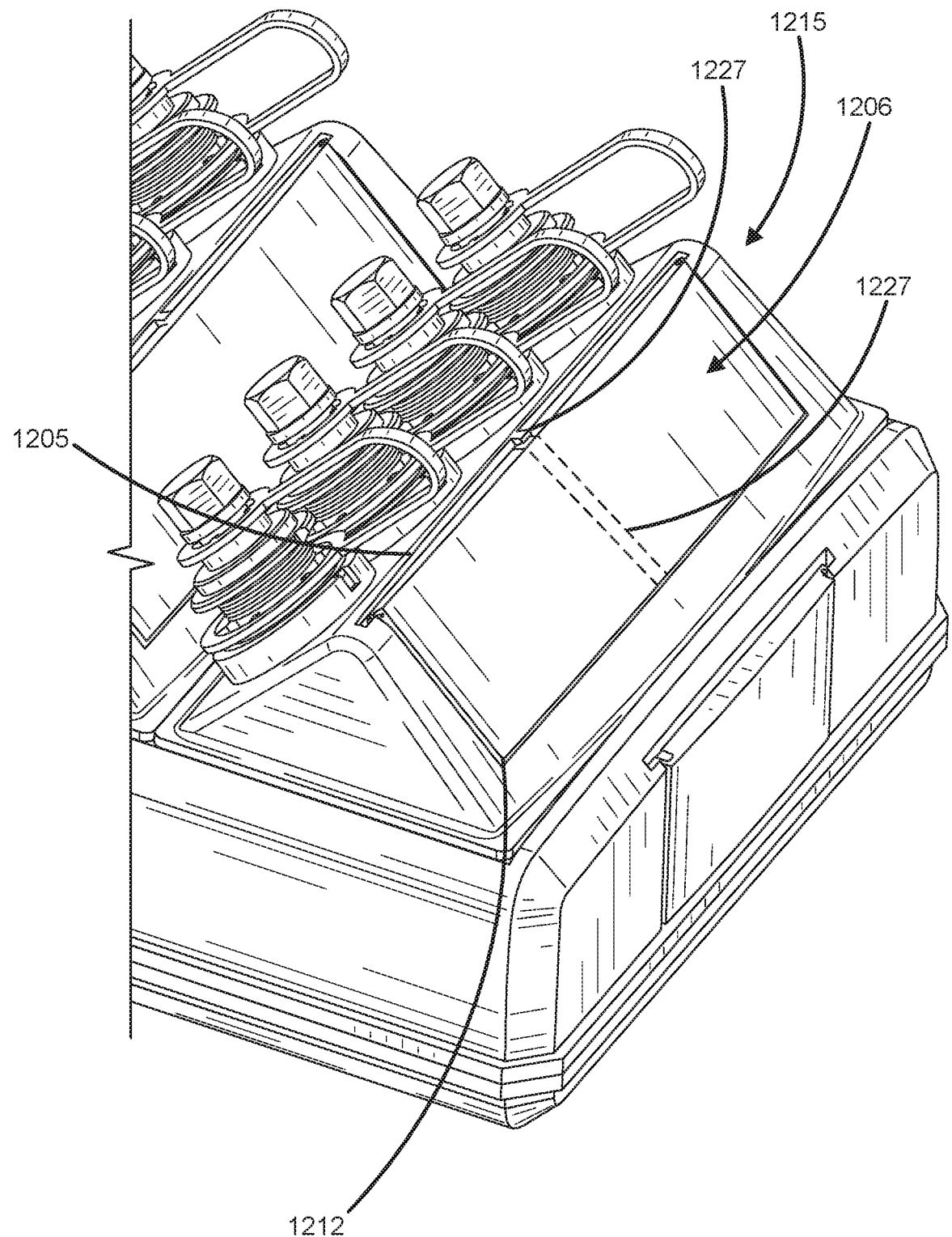
FIG. 49 illustrates a schematic perspective view of the indicia badge of FIG. 46

FIG. 48 shows a zoomed-in view of the holder 1212. As shown, the holder 1212 includes a securing feature 1225 that aids in securing an indicia badge 1206 within the holder 1212. In some examples, the securing feature 1225 is at least one of a recess and a projection that is configured to interact with a corresponding securing feature 1227 of the indicia badge (shown in FIG. 49). In some examples, the securing features 1225 and 1227 have a dovetail-like construction.

As noted above, FIG. 49 depicts the securing feature 1227 of the indicia badge 1206 positioned at a rear side 1205 of the indicia badge 1206. In some examples, the securing feature 1227 is only disposed at edges of the indicia badge 1206. In other examples, the securing feature 1227 spans the width of the indicia badge 1206. In other examples, the indicia badge 1206 can include a pair of RFID tags at the rear side 1205. In some examples, only the first indicia badges 1206a include the securing feature 1227. In some examples, the indicia badges 1206a/1206b include a securing feature, such as the holder engaging feature described above, at arms that extend from either side of the indicia badges 1206a/1206b. In other examples still, the securing feature 1227 is positioned between the arms.

Figure 50:
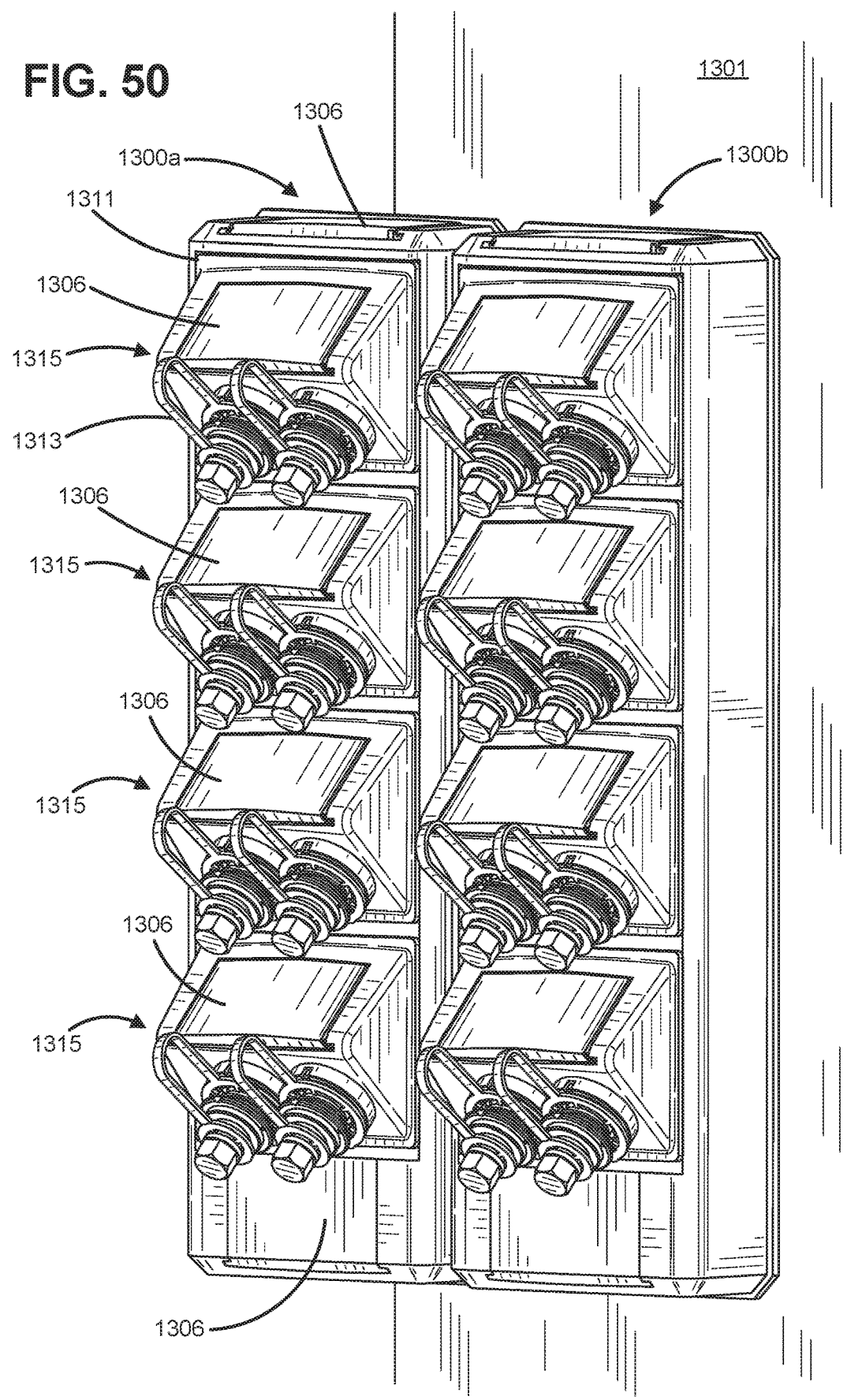
FIG. 50 illustrates a perspective view of a pair of example enclosures including an example indicia badge.

FIG. 50 shows a pair of enclosures 1300a, 1300b installed to a fixed surface 1301. In some examples, the fixed surface can be a pole extending above the ground. As depicted, the pair of enclosures 1300a, 1300b are identical. The enclosures 1300a, 1300b are substantially similar to the enclosures 1100 and 1200, described above. As shown, the enclosures 1300a, 1300b includes an indicia badge 1306, which is substantially similar to those described above. The indicia badge 1306 can be installed immediately adjacent rows 1315 and/or elsewhere on the enclosures 1300a, 1300b. As shown, the rows 1315 each include a pair of ports 1313.

Figure 51:
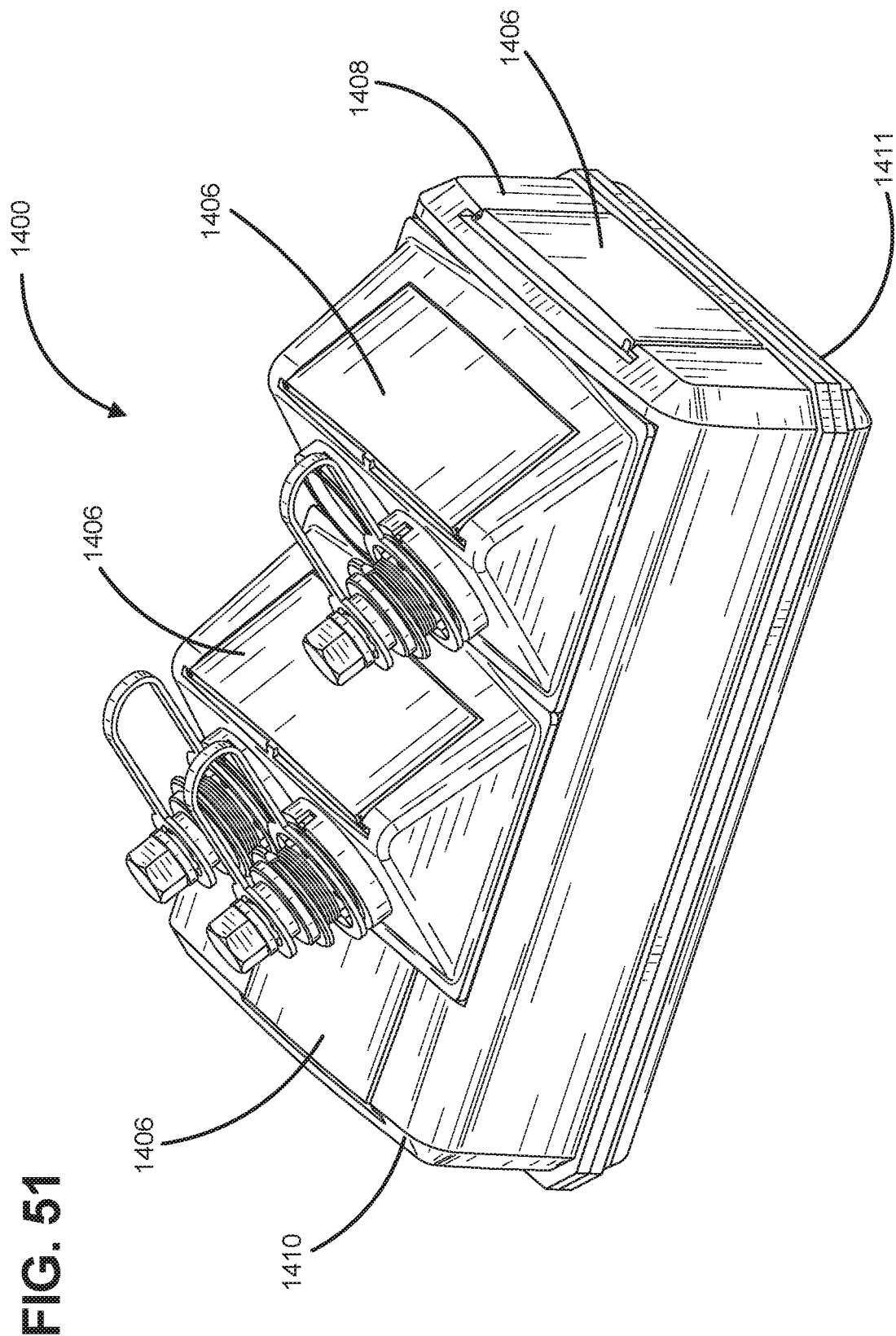
FIG. 51 illustrates a perspective view of an example enclosure including an example indicia badge.

FIG. 51 shows another enclosure 1400, according to one example of the present disclosure. As shown, the enclosure 1400 is substantially similar to the enclosures 1100, 1200, and 1300 described above. As shown, the enclosure 1400 includes an indicia badge 1406 of one size positioned at various locations on a cover 1411. For example, the indicia badge 1406 is positioned on a face 1410 and on an end 1408 of the cover 1411, separate from rows 1415, and additional indicia badges 1406 are positioned on each row 1415.

Figure 52:
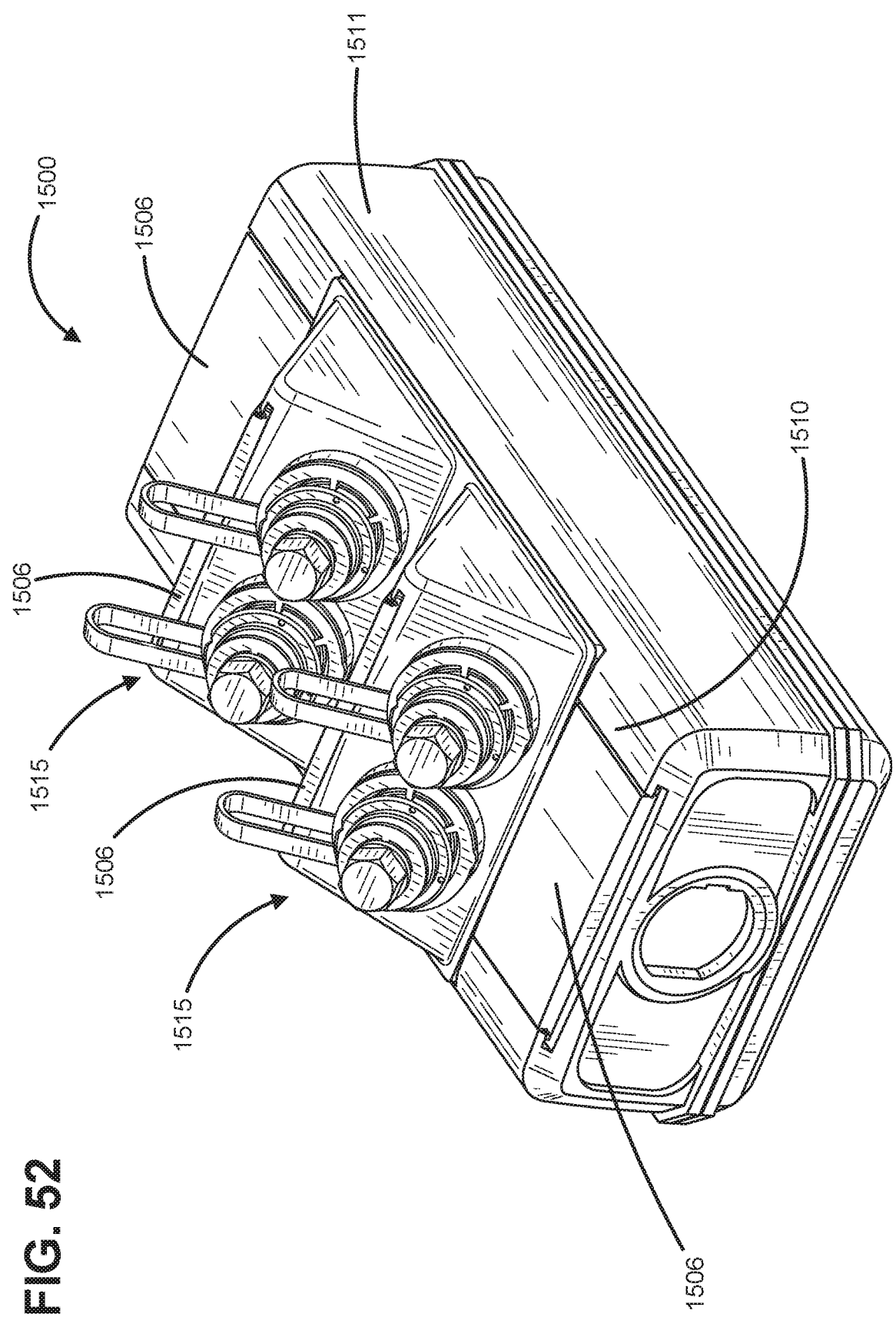
FIG. 52 illustrates a perspective view of an example enclosure including an example indicia badge.

FIG. 52 shows another enclosure 1500, according to one example of the present disclosure. As shown, the enclosure 1500 is substantially similar to the enclosures 1100, 1200, 1300, and 1400 described above. As shown, the enclosure 1500 includes an indicia badge 1506 of one size positioned at various locations on a cover 1511. For example, indicia badges 1506 are positioned on a face 1510 of the cover 1511, separate from rows 1515, and additional indicia badges 1506 are positioned on each row 1515.

Having described the preferred aspects and implementations of the present disclosure, modifications and equivalents of the disclosed concepts may readily occur to one skilled in the art. However, it is intended that such modifications and equivalents be included within the scope of the claims, which are appended hereto.

What is claimed is:

1. A telecommunications component comprising:
   an outer housing containing optical fibers, the outer housing including:
      a cover;
      a plurality of ports disposed on the cover; and
      a badge holder, the badge holder being configured to receive a badge, wherein the badge holder is immediately adjacent at least one port;
   a badge configured to be inserted into and retained with the badge holder, the badge including:
      indicia relating to an identity of at least one port of the plurality of ports;
      a pair of arms extending from opposing sides to engage with the badge holder of the outer housing; and
      a securing feature that is configured to secure the badge within the badge holder;
   wherein the securing feature includes at least one of a projection and a recess separate from the pair of arms, wherein the at least one of the projection and the recess mate with a corresponding other of the projection and the recess disposed within the badge holder.

2. The telecommunications component of claim 1, wherein the cover includes a plurality of badge holders, wherein the telecommunications component includes a plurality of badges positioned in at least some of the plurality of badge holders.

3. The telecommunications component of claim 1, wherein the securing feature is positioned between the pair of arms.

4. The telecommunications component of claim 1, wherein the at least one of the projection and the recess have a dovetail construction.

5. The telecommunications component of claim 1, wherein the badge includes the pair of arms each having a badge holder engaging feature, wherein each badge holder engaging feature is configured to mate with a corresponding badge engaging feature of the badge holder of the telecommunications component.

6. The telecommunications component claim 5, wherein the badge holder engaging feature is a projection and a rectangular channel, the projection including at least one ramped side and at least one non-ramped side.

7. The telecommunications system of claim 6, wherein the badge holder engaging feature of the badge includes at least one ramped surface outside of the rectangular channel.

8. The telecommunications component of claim 1, wherein the badge includes indicia relating to an identity of more than one port of the plurality of ports.

9. The telecommunications component of claim 1, wherein the badge further includes a feature that is identifying of the source of the telecommunications component, wherein the feature is at least one of a logo, a specific color, text information, a barcode, a QR code, and a RFID tag.

10. A telecommunications component comprising:
    an outer housing containing optical fibers, the outer housing including a base and a cover positionable over the base;
    at least one port disposed in the outer housing;
    a badge holder disposed in the outer housing, the badge holder being configured to receive a badge; and
    a badge configured to be inserted into and retained with the badge holder, the badge including:
       indicia relating to an identity of at least one port of the plurality of ports;
       a pair of arms extending from opposing sides to engage with the badge holder of the outer housing; and
       a securing feature that is configured to secure the badge within the badge holder;
    wherein the securing feature includes at least one of a projection and a recess separate from the pair of arms, wherein the at least one of the projection and the recess mate with a corresponding other of the projection and the recess disposed within the badge holder.

11. The telecommunications component of claim 10, wherein the cover includes a plurality of badge holders, wherein the telecommunications component includes a plurality of badges positioned in at least some of the plurality of badge holders.

12. The telecommunications component of claim 10, wherein the badge holder is immediately adjacent at least one port.

13. The telecommunications component of claim 10, wherein the plurality of ports are disposed on the cover.

14. The telecommunications component of claim 10, wherein the telecommunications component includes a plurality of badges positioned in at least some of the plurality of badge holders.

15. The telecommunications component of claim 10, wherein the badge includes the pair of arms each having a badge holder engaging feature, wherein each badge holder engaging feature is configured to mate with a corresponding badge engaging feature of the badge holder of the telecommunications component.

16. The telecommunications component of claim 15, wherein the badge holder engaging feature is a projection and a rectangular channel, the projection including at least one ramped side and at least one non-ramped side.

17. The telecommunications component of claim 16, wherein the badge holder engaging feature of the badge includes at least one ramped surface outside of the rectangular channel.

18. The telecommunications component of claim 10, wherein the outer housing includes a plurality of ports, wherein the badge holder is immediately adjacent at least one port, wherein the badge includes indicia relating to an identity of more than one port of the plurality of ports.

19. The telecommunications component of claim 10, wherein the badge further includes a feature that is identifying of the source of the telecommunications component, wherein the feature is at least one of a logo, a specific color, text information, a barcode, a QR code, and a RFID tag.

* * * * *

UNITED STATES PATENT AND TRADEMARK OFFICE
CERTIFICATE OF CORRECTION

PATENT NO. : 11,555,975 B2
APPLICATION NO. : 17/043337
DATED : January 17, 2023
INVENTOR(S) : Johan Geens et al.

It is certified that error appears in the above-identified patent and that said Letters Patent is hereby corrected as shown below:

In the Claims

Column 16, Line 21, Claim 6: "component claim" should read --component of claim--

Column 16, Line 25, Claim 7: "telecommunications system of claim" should read --telecommunications component of claim--

Signed and Sealed this
Twenty-third Day of January, 2024

*Katherine Kelly Vidal*

Katherine Kelly Vidal
*Director of the United States Patent and Trademark Office*